US009397861B1

(12) United States Patent
Tovino et al.

(10) Patent No.: US 9,397,861 B1
(45) Date of Patent: Jul. 19, 2016

(54) UNIFIED COMMUNICATION

(75) Inventors: Michael S. W. Tovino, Bend, OR (US);
Glen K. Okita, Los Altos, CA (US);
Lois Okino, Sunnyvale, CA (US);
AshvinKumar H. Patel, Sunnyvale, CA (US); Iouri Achmanov, San Jose, CA (US); Meigy Tsai, San Jose, CA (US)

(73) Assignee: Shoretel, Inc., Sunnyvale, CA (US)

( * ) Notice: Subject to any disclaimer, the term of this patent is extended or adjusted under 35 U.S.C. 154(b) by 393 days.

(21) Appl. No.: 12/985,326

(22) Filed: Jan. 5, 2011

Related U.S. Application Data

(60) Provisional application No. 61/365,262, filed on Jul. 16, 2010.

(51) Int. Cl.
*G06F 15/16* (2006.01)
*H04L 12/58* (2006.01)

(52) U.S. Cl.
CPC .............. *H04L 12/589* (2013.01); *H04L 12/58* (2013.01)

(58) Field of Classification Search
CPC ........ H04L 12/589; H04L 51/36; H04L 12/58
USPC ......................................... 709/206, 203, 204
See application file for complete search history.

(56) References Cited

U.S. PATENT DOCUMENTS

| 6,674,713 | B1* | 1/2004 | Berg et al. ..................... 370/217 |
| 6,707,906 | B1 | 3/2004 | Ben-Chanoch |
| 6,724,885 | B1 | 4/2004 | Deutsch et al. |
| 8,126,994 | B2 | 2/2012 | Richards |
| 8,233,609 | B2 | 7/2012 | Noble |
| 8,428,926 | B2 | 4/2013 | Choquet |
| 8,769,032 | B2 | 7/2014 | Ginevan et al. |
| 2002/0120787 | A1* | 8/2002 | Shapiro et al. ................ 709/311 |
| 2002/0176384 | A1 | 11/2002 | Chandra et al. |
| 2004/0225679 | A1 | 11/2004 | Oran |
| 2005/0213742 | A1 | 9/2005 | Fukuzawa |
| 2006/0035632 | A1 | 2/2006 | Sorvari et al. |
| 2006/0041415 | A1 | 2/2006 | Dybas et al. |
| 2006/0285691 | A1* | 12/2006 | Chin et al. ..................... 380/270 |
| 2007/0087766 | A1 | 4/2007 | Hardy et al. |

(Continued)

FOREIGN PATENT DOCUMENTS

| WO | 2007091089 | 8/2007 |
| WO | 2008107675 | 12/2008 |

OTHER PUBLICATIONS

Communigate Pro, "CommuniGate Pro From the IT Department's Perspective," 7 pages, retrieved on Apr. 12, 2011 from http://communigate.com/Papers/CGP_admin_view.pdf.

(Continued)

*Primary Examiner* — Hitesh Patel
(74) *Attorney, Agent, or Firm* — Tarolli, Sundheim, Covell & Tummino LLP

(57) ABSTRACT

A system for unified communication, according to one embodiment of the present invention, comprises a CAS communicatively coupled to a client. The CAS comprises a server communicatively coupled to a CAS application and a number of service providers. The server receives from the client a CAS message encoded in a CAS format and including a request for a unified communication service. The server communicates with the CAS application to determine a service type for the request. The server sends the request to one of the number of service providers. The server sends a reply message to the client.

28 Claims, 20 Drawing Sheets

(56) References Cited

U.S. PATENT DOCUMENTS

| | | |
|---|---|---|
| 2007/0121894 A1 | 5/2007 | Noble |
| 2008/0005290 A1* | 1/2008 | Nykanen et al. ............... 709/222 |
| 2008/0086564 A1* | 4/2008 | Putman et al. ................. 709/227 |
| 2008/0102810 A1 | 5/2008 | Lewis et al. |
| 2008/0133652 A1 | 6/2008 | Richards |
| 2008/0148154 A1 | 6/2008 | Burrell et al. |
| 2008/0244613 A1 | 10/2008 | Parthasarathy et al. |
| 2009/0003542 A1* | 1/2009 | Ramanathan et al. ..... 379/88.13 |
| 2009/0003569 A1 | 1/2009 | Forbes et al. |
| 2009/0077180 A1* | 3/2009 | Flowers et al. ............... 709/206 |
| 2009/0282458 A1 | 11/2009 | Hjelm |
| 2009/0307362 A1 | 12/2009 | Mendez et al. |
| 2009/0307365 A1 | 12/2009 | Mackay et al. |
| 2010/0208879 A1 | 8/2010 | Meriaz et al. |
| 2010/0217780 A1* | 8/2010 | Erola et al. .................... 707/802 |
| 2010/0310062 A1* | 12/2010 | Srinivasan et al. ....... 379/211.02 |
| 2010/0318397 A1 | 12/2010 | Singh et al. |
| 2011/0029923 A1 | 2/2011 | Xu et al. |
| 2011/0075828 A1 | 3/2011 | Okita et al. |
| 2011/0119377 A1 | 5/2011 | Patel et al. |
| 2011/0154222 A1* | 6/2011 | Srinivasan et al. ............. 715/753 |
| 2011/0249658 A1* | 10/2011 | Wohlert .................. H04W 4/04 370/338 |
| 2011/0261945 A1* | 10/2011 | Brock et al. ............. 379/211.02 |
| 2011/0296312 A1 | 12/2011 | Boyer et al. |
| 2012/0059892 A1 | 3/2012 | Ramanathan et al. |
| 2012/0096095 A1 | 4/2012 | Bhargava |
| 2012/0195305 A1 | 8/2012 | Chavda et al. |
| 2015/0017945 A1* | 1/2015 | Eckler ................... H04W 12/08 455/408 |

OTHER PUBLICATIONS

Communigate Pro, "Internet Communications Server, Email—Collaboration—VoIP," 1098 pages, retrieved on Apr. 12, 2011 from ftp://ftp.communigate.com/pub/cgpguide.pdf.

Communigate Pro, "CommuniGate Pro Overview," 4 pages, retrieved on Apr. 12, 2011 from http://communigate.com/Papers/CGP_overview.pdf.

Communigate Pro, "CommuniGate Pro Carrier Suite: Rich Media Applications that drive subscriber retention & increase ARPU," 2 pages, retrieved on Apr. 12, 2011 from http://communigate.com/Papers/Solutions_Overview_Enterprise_Datasheet.pdf.

Communigate Pro, "CommuniGate Pro Enterprise Suite: Rich Media Internet Communications to boost effective business communications," 2 pages, retrieved on Apr. 12, 2011 from http://communigate.com/Papers/Solutions_Overview_Enterprise_Datasheet.pdf.

* cited by examiner

500

701

701

801

801

1301

US 9,397,861 B1

UNIFIED COMMUNICATION

CROSS REFERENCE TO RELATED APPLICATION

This application claims priority from the following U.S. provisional patent application, which is hereby incorporated by reference: Ser. No. 61/365,262, filed on Jul. 16, 2010 and entitled "UC CLIENT APPLICATION SERVER (CAS) ARCHITECTURE & API."

BACKGROUND OF THE INVENTION

1. Field of the Invention

The present invention relates to communication systems. In particular, the present invention relates to unified communications among communication devices.

2. Description of the Background Art

Existing communication systems provide numerous services to numerous different clients. These services include, for example, telephony calls, voicemail, directory, etc. A first problem present in existing communication systems is that the clients must communicate with different interfaces in order to access the different services provided by the communication system. For example, an internet protocol phone accesses a different interface than a personal computer with a web browser, and both of these devices access a different interface than a mobile phone. Not only is this inconvenient for the user of the client, it also means the user must learn to use different interfaces.

A second problem present in existing systems is that the services offered by these systems cannot be easily opened up to third party developers that can provide new and innovative services for clients.

A third problem present in existing systems is that they do not support a subscription model that allows clients to subscribe to services offered by the communication system. For example, a user of a communication device cannot subscribe with the communication system to receive updates regarding the presence of another user on the network.

A fourth problem present in existing systems is that they are not able to allow an administrator to add, modify and delete permissions for other clients and/or client devices and to provide clients with error messages when they do not have permission to receive a requested service.

SUMMARY OF THE INVENTION

The present invention overcomes the deficiencies and shortcomings of the prior art by providing a system and method for unified communication. For example, the present invention provides unified communication among communication devices such as those used in a Voice over Internet Protocol ("VoIP") telephony system. The system of the present invention is particularly advantageous because it provides a single interface for various different communication devices to access different services. At a high level, the system comprises a Client Application Server (referred to herein as "the CAS 210") communicatively coupled to a client. The CAS comprises a server communicatively coupled to a CAS application and a number of service providers. The server receives from the client a CAS message encoded in a CAS format and including a request for a unified communication service. For example, the CAS message requests a directory listing. The server communicates with the CAS application to determine a service type for the request. The server sends the request to one of the number of service providers. The server sends a reply message to the client.

BRIEF DESCRIPTION OF THE DRAWINGS

The accompanying drawings illustrate several embodiments of the invention and, together with the description, serve to explain the principles of the invention. The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
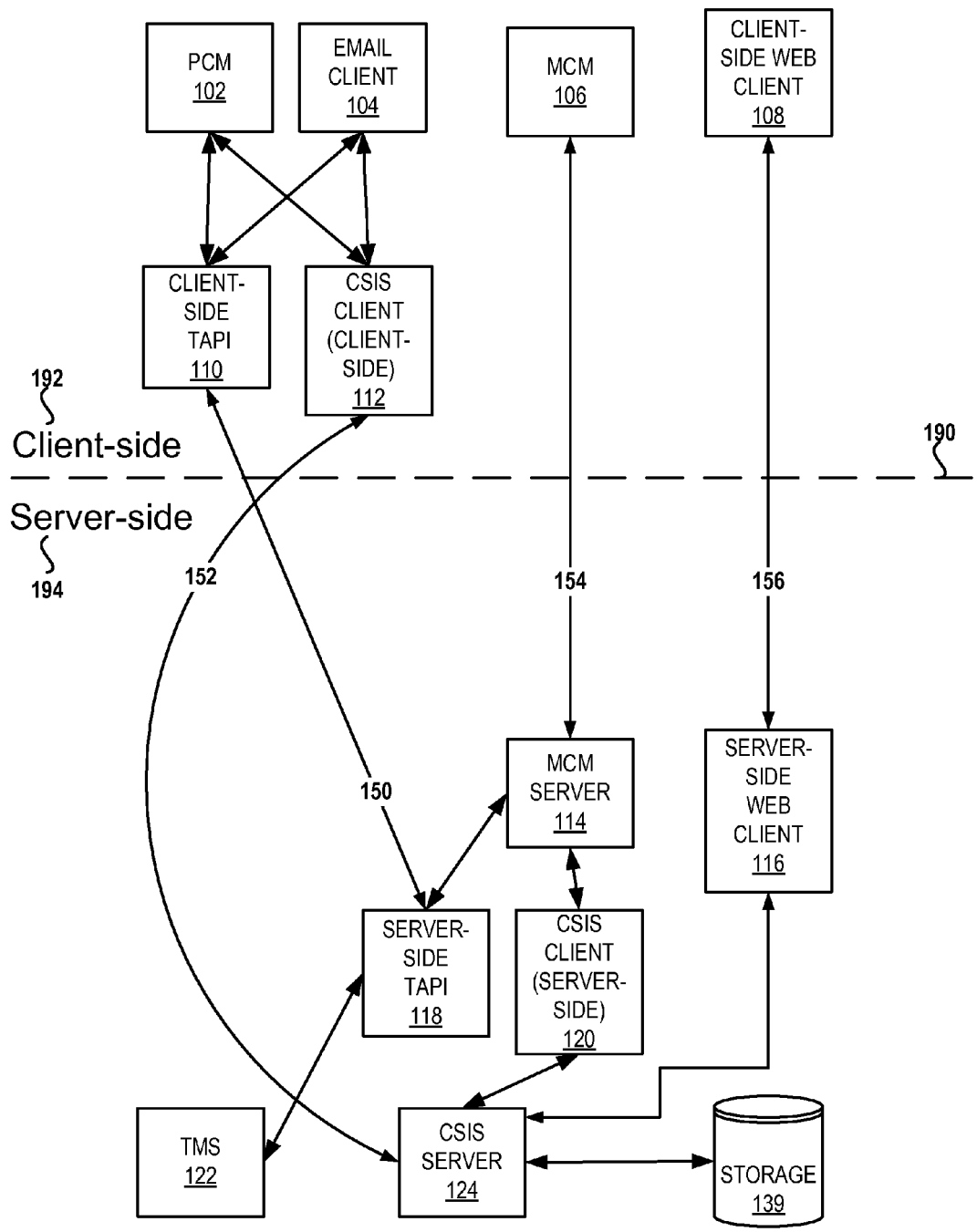
FIG. 1 is a block diagram illustrating a prior art telephony system.

A system and method for unified communications is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to system operation and particular hardware. However, the present invention applies to any type of computing device that can receive a data and commands, and any peripheral devices providing services.

Although the examples given herein describe the present invention in embodiments applicable to telephony, a person having ordinary skill in the art will recognize that the present invention is applicable to other technologies and provides unified communication for different communication devices not limited to telephony.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a non-transitory computer-readable memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, flash memory, any type of disk including floppy disks, optical disks, CD-ROMs and magnetic optical disks, read-only memories (ROMs), random access memories (RAMs), EPROMs, EEPROMs, magnetic or optical cards, or any type of media suitable for storing electronic instructions, each coupled to a computer system bus.

Descriptions herein to a server include one or more of: (1) a hardware server; (2) a software server executed by a processor; (3) a software server stored on a non-transitory computer-readable memory; (4) a virtual server executed by a processor; and (5) a virtual server stored on a non-transitory computer-readable memory. In one embodiment, the server is configured to provide the functionality of a telephony switch.

Descriptions herein a switch refer to a telephony switch, and include one or more of: (1) a hardware telephony switch; (2) a software telephony switch executed by a processor; (3) a software telephony switch stored on a non-transitory computer-readable memory; (4) a virtual telephony switch executed by a processor; and (5) a virtual telephony switch stored on a non-transitory computer-readable memory. A hardware telephony switch is a hardware device configured to provide the functionality of a telephony switch. A virtual switch is a virtualized telephony switch.

All descriptions herein to modules include one or more of (1) computer code and routines stored on a non-transitory computer-readable memory and (2) a hardware device comprised of one or more circuit boards and/or a processor.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Summary of Prior Art Telephony System 195

FIG. 1 illustrates a block diagram of a prior art telephony system 195. The prior art telephony system 195 includes a number of different clients. The clients are present on the client-side 192 of the network 190. The clients include a Personal Call Manager 102 ("PCM 102"), an electronic mail client 104 ("email client 104"), and Mobile Call Manager 106 ("MCM 106") and a browser 108. Different services are present on the server-side 194 of the network 190. For example, a Telephony Management System 122 ("TMS 122") and a Client Server Internet Service server 124 ("CSIS server 124") are available on the server-side 194 of the network 190 and provide various services to the clients. As will be described in greater detail in the following paragraphs, a problem present in the prior art telephony system 195 is that the clients must communicate with different interfaces in order to access the different services present on the server-side 194 of the network 190.

The prior art telephony system 195 includes four client-server architectures: (1) a prior art Personal Call Manager architecture (the "prior art PCM architecture") that communicates via signal line 150 and/or signal line 152; (2) a prior art email client architecture that communicates via signal line 152; (3) a prior art mobile client architecture that communicates via signal line 154; and (4) a prior art web client architecture that communicates via signal line 156. These four architectures are described below with reference to FIG. 1.

In one embodiment, the email client 104 is integrated with the TAPI 110 and the email client 104 signals the client-side TAPI 110 and the client-side TAPI 110 communicates with the TMS 122 via signal line 150 in order to initiate a telephone call. As described below with reference to FIG. 2, this and other complexities are not present in the embodiment of the present invention described for FIG. 2.

Prior Art PCM Architecture

The prior art PCM architecture is a client-server architecture used for providing telephony functionality to a client device via signal line 150 and 152. The client device (not pictured) is a device for providing a human user access to telephony services. For example, the client device is a hardware device such as an Internet Protocol phone ("IP phone"). In another embodiment, the client device is a softphone application stored on a non-transitory memory and executed by a processor (e.g., a softphone stored and executed by a personal computer). The prior art PCM architecture comprises: the PCM 102; the email client 104; a client-side Telephony Application Programming Interface 110 ("client-side TAPI 110"), the network 190, the TMS 122; and a server-side TAPI 118.

The PCM 102 manages telephony functionality on the client-side 192 of the network 190. The PCM 102 is code and routines stored on a non-transitory computer-readable memory (not pictured) that comprise instructions for causing a processor to perform steps necessary to manage telephony functionality on the client-side 192 of the network 190. For example, the PCM 102 is telephony management software stored on a non-transitory memory and executed by a processor-based device such as a personal computer (not pictured). The processor of the personal computer executes the PCM 102 and performs steps necessary to provide call management for telephony calls made using the telephony architecture. In one embodiment, the PCM 102 is a conventional call manager application. The PCM 102 is communicatively coupled to the client-side TAPI 110 (and other elements described below with respect to the email architecture).

The email client 104 provides email functionality for the client device. The email client 104 is code and routines stored on a non-transitory memory (not pictured) that comprise instructions for causing a processor to perform steps necessary to provide email functionality for the client device. For example, the email client 104 is email software such as Microsoft Outlook stored on a non-transitory memory and executed by a processor-based device such as a personal computer (not pictured). The email client 104 is communicatively coupled to the client-side CSIS client 112 (and other elements described below with respect to the email architecture).

The client-side TAPI 110 is a conventional TAPI that works to assist the PCM 102 in providing call control for a client device (e.g., the telephone device that the user of the PCM 102 is assigned to, the personal computer described above for the PCM 102, a modem, a VOIP switch and/or a private branch exchange). The client-side TAPI 110 is communicatively coupled to the network 190, the PCM 102 and the email client 104.

The network 190 is a partially public or a wholly public network such as the Internet. The network 190 can also be a private network or include one or more distinct or logical private networks (e.g., virtual private networks, Wide Area Networks ("WAN") and/or Local Area Networks ("LAN")). Additionally, the communication links to and from the network 190 can be wireline or wireless (i.e., terrestrial- or satellite-based transceivers). In one embodiment of the present invention, the network 190 is an IP-based wide or metropolitan area network.

The TMS 122 interfaces with the server-side TAPI 118 to provide telephony functionality for the client-side. The TMS 122 is code and routines stored on a non-transitory memory (not pictured) that comprise instructions for causing a processor to perform steps necessary to process telephony requests for a client-side device. The TMS 122 is communicatively coupled to the server-side TAPI 118. The TMS 122 receives requests for a telephony service from the client-side device via the server-side TAPI 118. The TMS 122 processes these requests and communicates with the server-side TAPI 118 to provide the requested telephony service to the client device.

The server-side TAPI 118 is a conventional server-side TAPI that communicates with the TMS 122 and the client-side TAPI 110 to allow the PCM 102 to control telephony functionality for a client device. The server-side TAPI 118 is communicatively coupled to the client-side TAPI 110 via signal line 150. The server-side TAPI 118 is also communicatively coupled to the TMS 122, the PCM 102 and the email client 104.

The following is an example of how the prior art PCM architecture operates. The PCM 102 requests a telephony function. The request is passed to the client-side TAPI 110. The client-side TAPI 110 sends the requests to the server-side TAPI 118 via the network 190 and signal line 150. The TMS 122 receives the request and processes the requests to provide the client with the requested telephony functionality. For example, the requested telephony functionality is a VOIP phone call with another client device. The server-side TAPI 118 communicates with the client-side TAPI 110 to connect the requested call.

Prior Art Email Architecture

The prior art email architecture is a client-server architecture used for providing email functionality to a client device via signal line 152. The prior art email client architecture comprises: the PCM 102; the email client 104; a client-side Client Server Internet Service client 112 ("client-side CSIS client 112"); the network 190; the CSIS server 124; and a storage device 139.

The PCM 102, email client 104 and network 190 are the same as described above with reference to the prior art PCM architecture, so those descriptions will not be repeated here.

The client-side CSIS client 112 communicates with the CSIS server 124 to facilitate communication between client-side devices and server-side devices. For example, the client-side CSIS client 112 is codes and routines stored on a client-side 192 device (e.g., a personal computer). The CSIS client 112 is communicatively coupled to the email client 104 and the PCM 102. The CSIS client 112 is also communicatively coupled to the CSIS server 124 via the network 190. The client-side CSIS client 112 receives a communication for a server-side device (represented by line 152) and uses hypertext transfer protocol messages ("HTTP messages") to communicate with the CSIS server 124 via the network 190.

The CSIS server 124 is a server that provides services requested by the client device. The requested service is specified by the HTTP messages received from the CSIS client 112. The CSIS server 124 is communicatively coupled to the network 190 and the storage device 139. The CSIS server 124 receives the HTTP messages from the CSIS client 112 (via the network 190) and processes the messages to provide the requested service. The storage device 139 is a non-transitory computer readable memory that stores data and information necessary for the CSIS server 124 to provide the requested service. For example, the storage device 139 stores one or more of: directory information, voice mails, call history data, etc. In one embodiment there are more than one storage device 139. For example, a first storage device (not pictured) stores call history data and a second storage device (not pictured) stores other data and information.

Prior Art Mobile Client Architecture

The prior art mobile client architecture is a client-server architecture used for providing a conventional mobile device (not pictured) access to the TMS 122 and the CSIS server 124. The mobile device is any device capable of accessing a mobile voice network (not pictured). For example, the mobile device is a mobile phone. The prior art mobile client architecture comprises: the MCM 106; the network 190, a Mobile Call Manager server 114 ("MCM server 114"); the server-side TAPI 118; the TMS 122; a server-side Client Server Internet Service client 120 ("server-side CSIS client 120"); the CSIS server 124; and the storage device 139.

The network 190, server side TAPI 118, TMS 122, CSIS server 124 and storage device 139 are the same as described above with reference to the prior art PCM architecture and the prior art email architecture, so those descriptions will not be repeated here.

The MCM 106 manages requests originating from mobile devices (e.g., smart phones, mobile phones, etc.). The MCM 106 is codes and routines stored on a non-transitory computer-readable memory (not pictured) that comprise instructions for causing a processor to perform steps necessary to manage the requests originating from the mobile devices. For example, the MCM 106 is mobile call management software stored on a non-transitory memory and executed by a processor-based device such as a smart phone (not pictured). The processor comprised within the smart phone executes the MCM 106 and performs steps necessary to manage requests. For example, a user of the smart phone provides an input. The MCM 106 receives the input and causes the processor to make a request (i.e., a mobile device request) that is sent to the MCM server 114. The mobile device request includes a request for a service. For example, the mobile device request includes a request to be connected on a call with an IP phone associated with the server side TAPI 118 and the TMS 122. The MCM 106 is communicatively coupled to the MCM server 114 via the network 190. The MCM 106 transmits the mobile device request to the MCM server 114 via the network 190.

The MCM server 114 is a server that communicates with the MCM 106 to provide services requested by mobile devices. The MCM server 114 is communicatively coupled to the network 190, the server-side TAPI 118 and the server-side CSIS client 120. The MCM 106 utilizes a mobile data network (not shown) in communicating with the MCM server 114. The MCM server 114 receives the mobile device request from the MCM 106 and processes the mobile device request to: (1) determine which service is being requested; (2) determined whether the request should be passed to the server-side TAPI 118 or the server-side CSIS client 120; and (3) transmit the request to the server-side TAPI 118 or the server-side CSIS client 120 as determined in step 2. The MCM server 114 stores data and information necessary to perform the above-described steps. For example, the MCM server 114 comprises a non-transitory computer-readable memory that stores data and information necessary to perform the above-described steps.

The server-side TAPI 118 performs functions similar to the client-side TAPI 110. The server-side TAPI 118 is a conventional TAPI that works to assist the MCM 114 in providing call control for a processor-based client device (e.g., a mobile device such as a smart phone or cell phone). The server-side TAPI 118 is communicatively coupled to the network 190.

The server-side CSIS client 120 performs functions similar to the client-side CSIS 112. The server-side CSIS client 120 communicates with the CSIS server 124 to facilitate communication between the MCM server 114 and the services provided by the CSIS server 124. For example, the server-side CSIS client 120 is code and routines stored on a server-side 194 device (e.g., a personal computer, switch, conference bridge, etc). The CSIS client 120 is communicatively coupled to the MCM server 114 and the CSIS server 124. The server-side CSIS client 120 receives a mobile device message from the MCM server 114 requesting services for a client-side 192 mobile device. The server-side CSIS client 120 translates the messages received from the MCM server 114 to equivalent HTTP messages that are communicated by the CSIS client 120 to the CSIS server 124.

Prior Art Web Client Architecture

The prior art web client architecture is a client-server architecture used for providing a client devices access to the services provided by the CSIS server 124 via signal line 156. The client device (not pictured) is a processor-based device used to access the network 190. The prior art web browser architecture comprises: a client-side web client 108; the network 190; a server-side web client 116; the CSIS server 124 and the storage device 139.

The network 190, CSIS server 124 and the storage device 139 are the same as described above with reference to the prior art PCM architecture, email architecture and mobile client architecture, so those descriptions will not be repeated here.

The client-side web client 108 provides a client device with access to the network 190. For example, the browser is a conventional browser application (e.g., Windows Internet Explorer, Mozilla Firefox, etc.) and the client device is a personal computer, smart phone, etc that stores the browser on a non-transitory memory and executes with a processor comprised within the computer to access the network 190. The browser 108 communicates with the server-side web client 116 to provide a client device with the services available from the CSIS server 124 via the network 190. The client-side web client 108 is communicatively coupled to the server-side web client 116 via the network 190. The client-side web client 108 sends messages to the server-side web client 116 via the network 190. The messages include, for example, requests for the services provided by the CSIS server 124.

The server-side web client 116 is similar to the client-side web client 108. The server-side web client 116 receives the messages from the client-side web client 108 via the network 190. The server-side web client 116 processes the messages to provide the client-side web client 108 with the services available from the CSIS server 124. The server-side web client 116 is codes and routines stored on a non-transitory computer-readable memory (not pictured) that comprises instructions for causing a processor (not pictured) to perform steps necessary to work with the client-side web client 108 to provide the client device with the services available from the CSIS server 124. The server-side web client 116 is communicatively coupled to the client-side web client 108 via the network 190. The server-side web client 116 is also communicatively coupled to the CSIS server 124.

Unified Communication System 295

As described briefly above with reference to FIG. 1, a problem present in with the prior art telephony system 195 is that the clients must communicate with different interfaces in order to access the different services present on the server-side 194 of the network 190. For example: (1) the PCM 102 must communicate with a client-side TAPI 110 in order to connect telephony calls using the TMS 122; (2) the email client 104 must communicate with a client-side CSIS client 112 in order to access the services provided by the CSIS server 124; (3) the MCM 106 must communicate with a MCM server 114 in order to connect telephony call using the TMS 122 or access the services provided by the CSIS server 124; and (4) the client-side web client 108 must communicate with a server-side web client 116 in order to access the services provided by the CSIS server 124. What is needed is a single interface for clients to communicate with and access the services present on the server-side 194 of the network 190.

Figure 2:
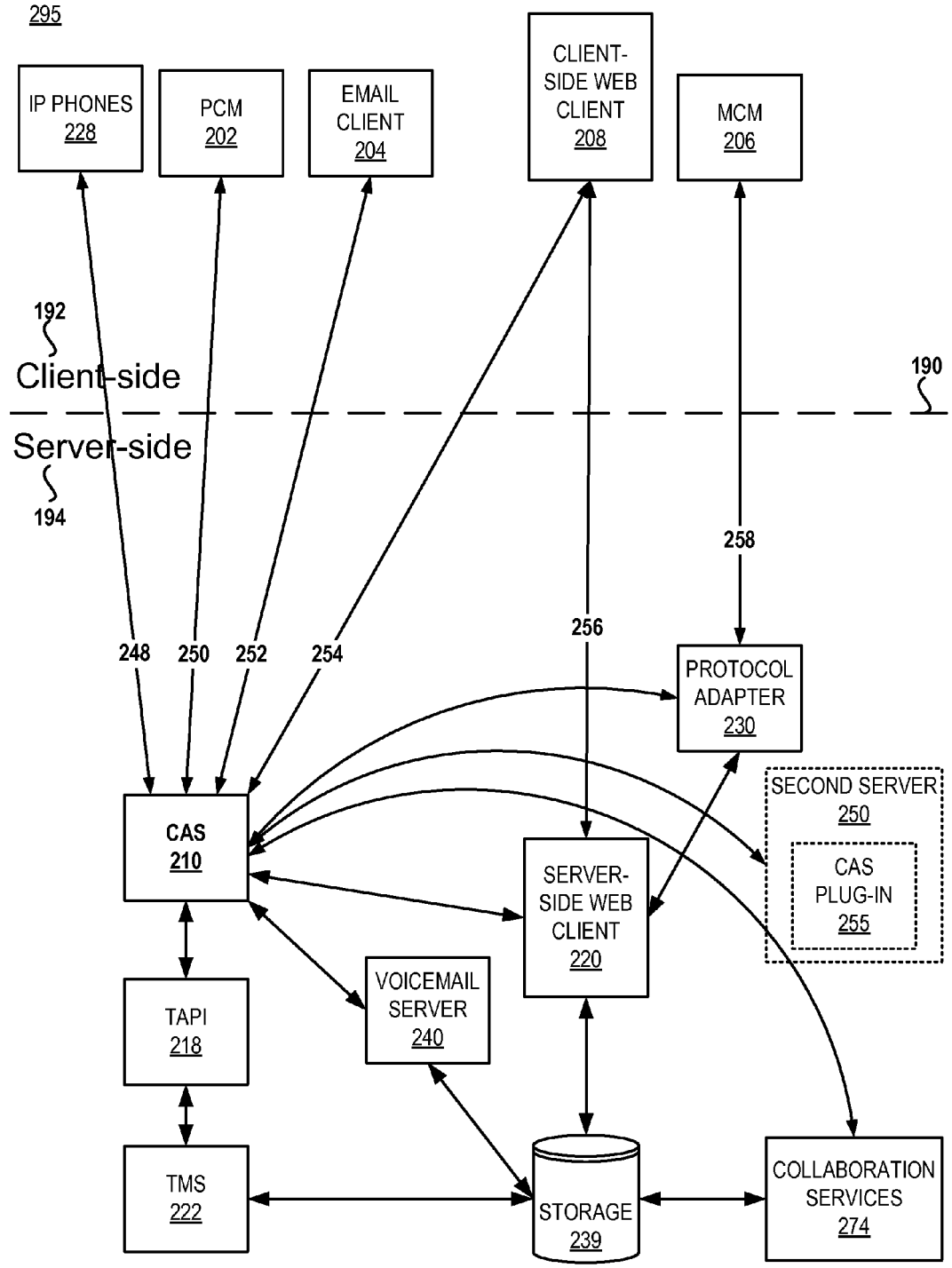
FIG. 2 is a high-level block diagram illustrating a functional view of a distributed unified communication system according to one embodiment of the present invention.

Referring now to FIG. 2, an embodiment of a unified communication system 295 according to one embodiment of the present invention is shown. Unified communication system 295 provides a single interface (i.e., the Client Application Server 210 referred to herein as "the CAS 210") for clients to access services available on the server-side 194 of the network 190. System 195 shown in FIG. 1 has numerous deficiencies that are overcome by system 295. These deficiencies include: (1) the different endpoints and/or clients exhibit different behavior for different server implementations; (2) the system 195 requires numerous interfaces that provide less possibility for reusing logic and computer code from one endpoint and/or client at another endpoint and/or client; and (3) multiple client-side transports are necessary, i.e., one for each signal line 150, 152, 154 and 156 described with reference to FIG. 1. In contrast, the CAS 210 of system 295 overcomes the deficiencies of the system 195 by providing a unified user interface in which: (1) endpoints and/or clients do not exhibit varying behavior; (2) logic and computer code can be reused among many different endpoints and/or clients; and (3) multiple client-side transports are not required.

The telephony system 295 also beneficially provides: (1) a plug-in architecture for expanding the services available to clients via the CAS 210; (2) a subscription model for allowing clients to subscribe to services available through the CAS 210; (3) the ability to provide multiple services to the client responsive to a single request message; and (4) the ability to allow clients having administrative rights to add, modify and delete permissions for other clients and/or client devices and to provide clients with error messages when they do not have permission to receive a requested service. These benefits, among others, are not present in the prior art telephony system 195 described above with reference to FIG. 1.

The system 295 comprises: an IP phone 228; a PCM 202; an email client 204; a client-side web client 208; a MCM 206, a network 190; the CAS 210; a protocol adapter 230; a TAPI 218; a TMS 222; a storage device 239; a voicemail server 240; a server-side web client 220; a collaboration services device 274; and a protocol adapter 230. Optionally, the system 295 further comprises a second server 250 and a Client Application Server plug-in 255 ("CAS plug-in 255"). In one embodiment, the system 295 comprises one or more elements 228, 202, 204, 208, 206, 190, 210, 230, 218, 222, 239, 240 220, 274, 250, 255. In another embodiment, one or more systems 295 are communicatively coupled to one another and communicate with one another via the CAS 210 as described below.

The system 295 has a number of clients: the Internet Protocol phone 228 ("IP phone 228"); the PCM 202; the email client 204; the client-side web client 208; and the MCM 206. The IP phone 228, PCM 202, email client 204 and client-side web client 208 are each communicatively coupled to a the CAS 210 via the network 190. The CAS 210 is configured to, among other things, provide clients located on the client-side 192 of the network 190 with access to services available on the server-side 194 of the network 190. In other words, the CAS 210 provides a single interface for the IP phone 228, the PCM 202, the email client 204 and the client-side web client 208 to communicate with and access the services available on the server-side 194 of the network 190. Optionally, the system 295 also includes other clients (e.g., a softphone stored and executed by a personal computer or equivalent computing device, a conference bridge storing and executing a telephony switch call manager application known to those skilled in the art, etc) that are communicatively coupled to the CAS 210 to receive services available through the CAS 210.

The IP phones 228, the PCM 202, the email client 204 and the client-side web client 208 are communicatively coupled to the CAS 210 via the network 190. The communicative coupling of the IP phones 228 to the CAS 210 is represented by line 248, the communicative coupling of the PCM 202 to the CAS 210 is represented by the line 250, the communicative coupling of the email client 204 to the CAS 210 is represented by line 252, and the communicative coupling of the client-side web client 208 to the CAS 210 is represented by signal line 254. The MCM 206 communicates with the CAS 210 via the network 190 and the protocol adapter 230. The communicative coupling of the MCM 206 to the protocol adapter is represented by line 258, and the protocol adapter is communicatively coupled to the CAS 210. The protocol adapter 230 receives the communication from the MCM 206, translates the communication to a different protocol (described below) and sends the communication to the CAS 210. The client-side web client 208 also has the ability to communicate with the CAS 210 via a server-side web client 220. The communicative coupling of the client-side web client 208 to the server-side web client 220 is represented by line 256. The server-side web client 220 is in turn communicatively coupled to the CAS 210.

In one embodiment, the protocol adapter 230 is configured as a client device. For example, the protocol adapter 230 is configured as a proxy (or a server) for the MCM 206 and the protocol adapter 230 is communicatively coupled to the CAS 210 as a client device. One having ordinary skill in the art will recognize different configuration in which the protocol adapter 230 is configured as a client device.

In one embodiment, the MCM 206 is communicatively coupled to the CAS 210. For example, the CAS 210 is configured to perform the functionality of the protocol adapter 230 or the MCM 206 is configured to communicate with the CAS 210 using a CAS message. Thus, in one embodiment the system 295 does not include a protocol adapter 230.

The PCM 202, the email client 204, the client-side web client 208, the MCM 206, the TAPI 218, the TMS 222, the storage 239 and the server-side web-client 220 provide functionality similar to the PCM 102, email client 104, client-side browser 108, the MCM 106, the TAPI 118, the TMS 122, the storage 139 and the server-side web-client 120 described above with reference to FIG. 1, respectively, so that description will not be repeated here. In one embodiment, a difference between the PCM 202, the email client 204, the client-side web client 208, the MCM 206, the TAPI 218, the TMS 222, the storage 239 and the server-side web-client 220 versus the similarly named components of FIG. 1 is that the PCM 202, the email client 204, the client-side web client 208, the MCM 206, the TAPI 218, the TMS 222, the storage 239 and the server-side web-client 220 comprise, among other things, a CAS client (not pictured). The CAS client is code and routines that enable the PCM 202, the email client 204, the client-side web client 208, the MCM 206, the TAPI 218, the TMS 222, the storage 239 and the server-side web-client 220 to communicate with the CAS 210 (either directly or indirectly). The TAPI 218 and the server-side web client also differ from the similarly named components of FIG. 1 in that they are communicatively coupled to the CAS 210. In one embodiment, the CAS 210, the network 190, the client-side 192 and the server-side 194 depicted in FIG. 2 are similar to the elements depicted in FIG. 1 having like reference numerals, so the description for these elements will also not be repeated here.

The IP phone 228 is a conventional internet protocol phone. For example, the IP phone 228 is a hardware IP phone or a softphone that is stored in a non-transitory memory (not pictured) and executed by a processor (not pictured). The IP phone 228 is communicatively coupled to the CAS 210 via the network 190. The IP phone 228 communicates with the CAS 210 via the network 190 using the signal line 248. Examples of the IP phone 228 communicating with the CAS 210 are described below.

The CAS 210 is a server 330, the CAS application 320 and the modules 324, 332, 334, 336, 338, 340, 350 and 360 (referred to herein collectively as "the CAS modules") described with reference to FIG. 3. The CAS 210 receives a request message from a client and processes one or more requests included in the request message. For example, the request message includes a request for a unified communication service. A unified communication service is any service that is provided by the CAS 210. Although unified communication services include telephony services, they are not limited to just telephony services. For example, a unified communication service is a service as described with reference to FIGS. 5A-15. In one embodiment, the CAS 210 sends reply messages to the clients. The reply message includes, for example, a service that is responsive to the request included in the request message, an error message indicating that the client does not have permission to receive the requested service, etc. Other examples of reply messages are described below. The CAS 210 is communicatively coupled to the IP phone 228, the PCM 202, the email client 204 and the client-side web client 208 via the network 190. The CAS 210 communicates with the clients using various signal lines: the IP phone 228 communicates with the CAS 210 using the signal line 248; the PCM communicates with the CAS 210 using the signal line 250; the email client 204 communicates with the CAS 210 using the signal line 252; and the client-side web client communicates with the CAS 210 using the signal line 254.

In one embodiment, the CAS 210 is a processor-based hardware device and the server 330 is a software server (i.e., virtual server) stored on a non-transitory memory of the CAS 210 (not pictured). The non-transitory memory also stores the CAS application 320 and the CAS modules described with reference to FIG. 3. A processor of the CAS 210 (not pictured) executes the server 330, the CAS application 320 and the CAS modules. For example, the server 330, the CAS application 320 and the CAS modules are stored on a hardware telephony device such as a telephony switch (not pictured) configured as the CAS 210. The hardware telephony device (e.g., the telephony switch) is adapted to store, execute and implement the server 330, the CAS application 320 and the CAS modules. A person having ordinary skill in the art will recognize based on the above example that in one embodiment, the CAS 210 is processor-based hardware device that stores and executes a virtual server that provides the functionality of the server 330, the CAS application 320 and the CAS modules. Examples of this functionality are described with reference to FIG. 5A through FIG. 15.

In one embodiment, the CAS 210 communicates with the clients (e.g., the IP phone 228, the PCM 202, the email client 204, the client-side web client 208), the protocol adapter 230, the second server 250 and the collaboration services device 274 using CAS messages. A CAS message is any message that is sent or received by the CAS 210. In one embodiment, the CAS message includes standardized headers, i.e., the messages use certain predetermined headers. In one embodiment, the CAS messages are HTTP messages (i.e., the CAS messages are passed between the client and the CAS 210 via HTTP). The standardized headers provide the benefit of making the messages easier to parse in an understandable manner so that the client does not need to have any additional modifications other than being configured to send, receive and parse CAS messages. In one embodiment, the data included in the CAS message is encoded using JavaScript Objection Notation ("JSON"), Extensible Markup Language ("XML") or a similar set of rules for encoding messages. A CAS message having standardized headers and encoded in JSON, XML or a similar set of rules for encoding messages is referred to herein as "a CAS message encoded in a CAS format." In one embodiment, when such a CAS message as described in the immediately preceding sentence is encoded in JSON it is referred to herein as "a CAS message encoded in a JSON-based CAS format," and when such a CAS message is encoded in XML it is referred to herein as "a CAS message encoded in a XML-based CAS format." The CAS 210 is described in greater detail with reference to FIG. 3.

Five examples of CAS messages follow, each including examples of standardized headers. A first example CAS message follows. In this example a client is sending a request message to the CAS 210:

{"topic":"find","message":"lookup-contacts","timestamp":1291231894934,"sequence-id":26,"request-id":26, "tokens":"v","source-flags":255,"search-fields":−1, "result-fields":2939,"flags":0,"sort":2,"max":25,"pres":0}

The above example includes examples of standardized headers. Specifically, the specialized headers are: (1) "topic;" (2) "message;" (3) "timestamp;" (4) "sequence-id;" and (5) "request-id."

A second example CAS message follows. In this example a client is sending a request message to the CAS 210:

{"topic":"tel","message":"make-call","timestamp": 1291231721388,"sequence-id":27,"request-id":27,"dest": "501","name-hint":"Vanessa","guided-conf-transfer":true}

The second example CAS message includes the same standardized headers as the first example CAS message. Similar standardized headers are present in each of the following example CAS messages. A person having ordinary skill in the art will recognize that other standardized headers are possible.

A third example CAS message follows. In this third example CAS 210 is sending a reply message to the client:

{"topic":"find","message":"lookup-contacts","timestamp":1291231884203,"sequence-id":135,"request-id":26, "response":0,"contacts":[["id","source-type","first","mid", "last","co","dept","source-name","contact-points","flags"], ["2", 5,"Vanessa"," "," "," "," "," ",[["id","type","addr", "addr-canonical","field"],[1,16,"501","501",10],[2,2, "VKensington@tovino.shoretel.com", "VKensington@tovino.shoretel.com",50],[3,4, "VKensington@shoretel.com", "VKensington@shoretel.com", 1000]], 0],["SysDN:102", 16,null,null,"Voice Mail Login"," "," "," ",[["id","type", "addr","addr-canonical","field"],[1,16,"102","102", 10]], 0]]}

A fourth example CAS message follows. In this fourth example CAS 210 is sending a reply message to the client:

{"topic":"tel","message":"make-call","timestamp": 1291231710665,"sequence-id":62,"request-id":27,"response":6}

A fifth example of CAS messages follows. The fifth example includes an example of an asynchronous completion event for the fourth example CAS message described above:

{"topic":"tel","message":"tel-completion-evt","timestamp":1291231710704,"sequence-id":65,"response":6,"error":0}

The voicemail server 240 is a server that receives requests to perform write or read operations on voicemail data that is stored in the storage device 239. In one embodiment, the voicemail server 240 is comprised within a telephony switch, a conference bridge or some other processor-based telephony device having a non-transitory memory (not pictured). The voicemail data is stored in the non-transitory memory. The voicemail data is described in greater detail with reference to FIG. 4. In one embodiment, the voicemail data is stored on a memory that comprises the voicemail server 240. The voicemail server 240 is communicatively coupled to the CAS 210 and the storage device 239. The voice mail server 240 receives a request from the CAS 210 to perform a read operation or a write operation on the voicemail data stored in the storage device 239. In one embodiment, the voicemail server 240 is communicatively coupled to the TAPI 218 and the TMS 222 and the voicemail server 240 communicates with the CAS 210 to provide voicemail services to the TAPI 218 and the TMS 222.

The protocol adapter 230 receives messages from the MCM 206 and translates them to CAS messages that are sent by the protocol adapter 230 to the CAS 210. A person having ordinary skill in the art will recognize that messages received from the MCM 106 originate on a mobile network (not pictured) and have a protocol that is different from a CAS message. For the purpose of clarity, these messages are referred to herein as mobile device messages. The protocol adapter 230 is communicatively coupled to the MCM 206 via the network 190. The protocol adapter 230 is also communicatively coupled to the CAS 210. The protocol adapter 230 receives the mobile device messages and translates these messages to CAS messages. The protocol adapter 230 sends the CAS message to the client. The CAS message includes a request for a service that was included in the mobile device message. The CAS 210 communicates with the protocol adapter 230 (and other elements such as the TAPI 218, voicemail server 240, etc.) to process the CAS message and provide the mobile device with the requested service. In one embodiment, the protocol adapter 230 is communicatively coupled to the server-side web client 220.

In one embodiment, the protocol adapter 230 is a hardware device comprised of electronic circuit boards and/or firmware adapted to provide the functionality described above for the protocol adapter 230. The protocol adapter 230 optionally comprises a processor and/or a non-transitory memory that stores code and routines such as the firmware. In another embodiment the protocol adapter 230 is codes and routines stored on a non-transitory memory and configured to provide the functionality described above for the protocol adapter 230 when executed by a processor (not pictured). For example, the protocol adapter 230 is an application stored in a memory of a computer (not pictured) and executed by a processor (not pictured) comprised within the computer.

In one embodiment, the protocol adapter 230 and the web client 220 are comprised within the same hardware device (e.g., any telephony device). For example, the protocol adapter 230 and the web client 220 are codes and routines stored on a non-transitory memory in the hardware device and configured to provide the functionality described above for the protocol adapter 230 and/or the web client 220 when executed by a processor (not pictured). One having ordinary skill in the art will recognize that in one embodiment one or more of the protocol adapter 230 and the web client 220 are electronic circuit boards and/or firmware adapted to provide the functionality described above for the protocol adapter 230 and/or the web client 220.

The collaboration services device 274 provides services such as instant messaging and presence to the clients. The collaboration services device 274 is communicatively coupled to the storage device 239 and the CAS 210. The collaboration services device 274 receives a CAS message from the CAS 210 requesting instant messaging and/or presence services and the collaboration services device 274 communicates with the CAS 210 to provide these services to the requesting client.

In one embodiment, the collaboration services device 274 is a hardware device comprised of electronic circuit boards and/or firmware adapted to provide the functionality described above for the collaboration services device 274. The collaboration services device 274 optionally comprises a processor and/or a non-transitory memory that stores codes and routines such as the firmware that is executed by the processor. In another embodiment, the collaboration services device 274 is codes and routines stored on a non-transitory memory and configured to provide the functionality described above for the collaboration services device 274 when executed by a processor (not pictured). For example, the collaboration services device 274 is an application stored in a memory of a computer (not pictured) and executed by a processor (not pictured) comprised within the computer.

A person having ordinary skill in the art will recognize that in one embodiment the TAPI 218 is configured to provide a portion of the presence service to the client device (e.g., IP phone 228). For example, the TAPI 218 provides information such as whether the user of the client device is on the phone, out of office or whether the client device is ringing.

In one embodiment, the TAPI 218 and the TMS 222 communicate with each other to provide real time information about whether users are on a call. In another embodiment, the TAPI 218 and/or the TMS 222 communicate with the configuration storage 446 (see FIG. 4) to provide the client with information about whether a user is out of the office. For example, the configuration storage 446 is a database that is accessed by the TMS 222 to retrieve the information described above and then relayed to the TAPI 218 which then communicates with the CAS 210 to provide the client with this information via a CAS reply message. In one embodiment, the CAS 210 communicates with the configuration storage 446 to determine some or all of the presence information it will provide to the client (e.g., whether the user is out of the office).

The second server 250 is a server configured to communicate with the CAS 210 using the CAS plug-in 255. In one embodiment, this architecture beneficially isolates third party software operating on the second server 250 from the CAS 210 since the CAS plug-in 255 is executing in a different process than the processes executed on the CAS 210. The second server 250 is a server that is communicatively coupled to the CAS 210. The second server 250 communicates with the CAS 210 to provide services requested by clients that are available via the second server 250. For example, the second server 250 is a third party server that communicates with the CAS 210 to provide services such as presence or instant messaging to clients. In one embodiment, the collaboration services device 274 is a second server 250. The second server 250 includes a non-transitory storage medium (not pictured) and a processor (not pictured).

In one embodiment, the CAS plug-in 255 comprises third-party software and the CAS plug-in 255 and the CAS 210 execute on the same server, but are in different processes. This architecture beneficially isolates the CAS 210 from third party software since the CAS 210 is in a different process than the CAS plug-in 255.

The second server 250 comprises a CAS plug-in 255. The CAS plug-in 255 is codes and routines that enable the second server 250 to communicate with the CAS 210. The CAS plug-in 255 is stored on the non-transitory storage medium and executed by the processor comprised within the second server 250.

In one embodiment, the CAS plug-in 255 is a service that provides additional functionality (e.g., services and/or events) to clients communicatively coupled to the CAS 210. The services provided by the CAS plug-in 255 are referred to herein as plug-in services. The events provided by the CAS plug-in 255 are referred to herein as plug-in events. The CAS plug-in 255 operates on any processor-based device having a memory to store the CAS plug-in 255 such as the second server 250 described with reference to FIG. 2 or the server 330 described with reference to FIG. 3. In one embodiment, clients log into CAS 210 and access the services of the CAS plug-in using CAS messages that request the plug-in services via the CAS 210. In one embodiment, CAS 210 forwards the requests to the CAS plug-in 255, the CAS plug-in 255 provides a response to CAS 210 and CAS 210 forwards the response to the client. In another embodiment, the CAS plug-in 255 is enabled to send events to CAS 210 and CAS 210 forwards the events to the client.

In yet another embodiment, the CAS 210 is configured so that the CAS plug-in 255 is required to register with the CAS 210 to be eligible to provide services to the clients. For example, CAS 210 is configured to have the services organized into topics (e.g., telephony, email, chat, instant messaging, etc). Some of these topics are set as restricted. A restricted topic is a topic of service that no CAS plug-in 255 can provide to the client. For example, the telephony service can be restricted so that no CAS plug-in 255 can provide telephony service to the clients. In this case, only the telephony module 332 comprised within the CAS 210 can provide telephony service to clients. In one embodiment, the CAS plug-in 255 registers with CAS 210 to provide services on any non-restricted topic. Once the CAS plug-in 255 is registered, the clients access the features of this plug-in 255 through CAS 210 using an API specific to the plug-in 255.

In one embodiment, the CAS 210 is configured so that only one CAS plug-in 255 can register for a given topic per instance of the CAS 210. In another embodiment, one plug-in 255 is allowed to register an unlimited number of topics per instance of the CAS 210.

A person having ordinary skill in the art will recognize that the above-described plug-in architecture enables the CAS 210 to access additional functionality provided by the CAS plug-in 255. For example, the second server 250 is a server owned and operated by the same company that owns and operates the CAS 210, and that company implements upgrades to the services provided by CAS 210 via the second server 250 instead of upgrading the CAS 210 itself. This architecture also beneficially enables the CAS 210 to integrate third party applications and services into the CAS 210. For example, an integrator can write a CAS plug-in 255 that provides the third party application and/or service and provide a means to enable the CAS 210 to access the services available via the CAS plug-in 255. The CAS plug-in 255 is stored on a different device such as the second server 250. In one embodiment, the means to enable the CAS 210 to access the services and/or events available via the CAS plug-in 255 is a client that is stored on CAS 210 (or a plug-in that is stored on a non-transitory memory of the CAS 210 and is different from the CAS plug-in 255) that enables the CAS 210 to access the CAS plug-in 255 when executed by a processor of the CAS 210. This client (or plug-in) is referred to herein as an access client (or an access plug-in).

As described above, the CAS plug-in 255 also provides additional functionality. This additional functionality includes any service not provided by the CAS 210 or duplicative in one or more respects. For example, the CAS plug-in 255 can provide clients of the CAS 210 with a cloud computing-based telephony service.

A person having ordinary skill in the art will recognize that, in one embodiment, the access client (or access plug-in) does not require a second server outside of the CAS 210 to function. For example, the CAS plug-in 255 is stored on any processor-based device and the access client (or access plug-in) communicates with the CAS plug-in 255 to provide different services to clients that communicate with the CAS 210.

In one embodiment the CAS plug-in 255 is stored on the CAS 210 and used by the CAS 210 to communicate with the second server 250 and provide clients with services available on the second server 250. For example, the CAS 210 stores the CAS plug-in 255 and the CAS plug-in 255 enables the CAS 210 to communicate with a second server 250 and retrieve services and events from the second server 250.

A person having ordinary skill in the art will recognize how the system 295 can be modified to include various telephony devices not shown, including, for example, a conference bridge, a telephony switch, a softphone, a smartphone, a mobile phone, etc.

CAS 210

Figure 3:
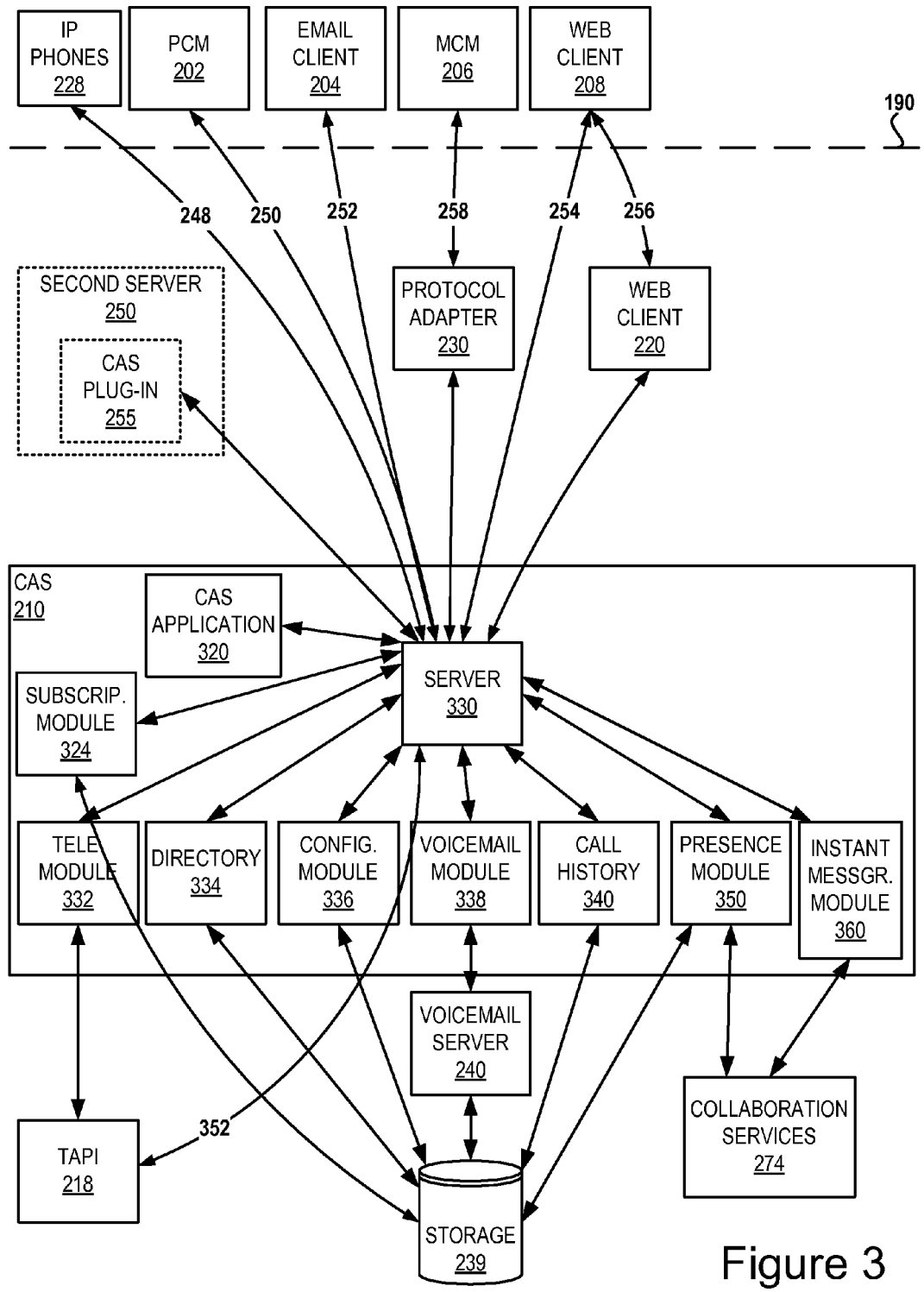
FIG. 3 is a high-level block diagram illustrating a client application server according to one embodiment of the present invention.

Turning to FIG. 3, depicted is the CAS 210 according to one embodiment of the present invention. In addition to the CAS 210, FIG. 3 also depicts: the IP phone 228; the PCM 202; the email client 204; the MCM 206; the web client 208; the network 190; the protocol adapter 230; the web client 220; the TAPI 218; the voicemail server 240; the storage device 239; the collaboration services 274; and a number of signal lines 248, 250, 252, 254, 256, 258, 352. Optionally, the system depicted in FIG. 3 also comprises a second server 250 that includes the CAS plug-in 255 or other clients that are not depicted in FIG. 3 such as softphones, conference bridges, call center applications, etc that are communicatively coupled to the CAS 210 via a signal line and the network 190. These elements listed above are similar to the elements described above for FIG. 2, so that description will not be repeated here.

The CAS 210 comprises: a Client Application Server application 320 ("CAS application 320"); a server 330; a subscription module 324; a telephony module 332; a directory module 334; a configuration module 336; a voicemail module 338; a call history module 340; a presence module 350; and an instant messenger module 360. In one embodiment, the CAS 210 comprises one or more processors (not pictured) and/or one or more non-transitory computer-readable memories (not pictured).

The server 330 is a server that receives CAS messages and processes these messages to provide services requested by the clients. The server 330 is communicatively coupled to: the PCM 202 (via the network 190); the email client 204 (via the network 190); the protocol adapter 230; the client-side web client 208 (via the network 190); the server-side web client 220; the TAPI 118 (via signal line 352); the CAS application 320; and the CAS modules (i.e., modules 324, 332, 334, 336, 338, 340, 350, 360). In one embodiment, the server 330 includes one or more processors and one or more non-transitory computer-readable memories. The server 330 communicates with the above-described elements to process requests included in CAS messages received by the server 330 as described below with reference to FIGS. 5A-15. In one embodiment, one or more of the CAS application 320 and the CAS modules 324, 332, 334, 336, 338, 340, 350, 360 do not communicate with the server 330 using CAS messages and the server 330 translates messages to CAS messages that are sent as reply messages to the clients.

The CAS application 320 is codes and routines that, when executed by a processor, cause the server 330 to provide the functionality described below with reference to FIGS. 5A-15. For example, the CAS application 320 translates messages received from the CAS modules to CAS messages that are sent to the client as reply messages. The CAS application 320 is communicatively coupled to the server 330. The CAS application 320 is stored on a non-transitory memory and executable by a processor. For example, the CAS application 320 is stored on a non-transitory memory comprised within the server 330 and executed by a processor comprised within the server 330.

In one embodiment, one or more of the CAS application 320 and the CAS modules 324, 332, 334, 336, 338, 340, 350, 360 are stored on a memory that comprises the server 330 or one or more storage devices communicatively coupled to the server 330.

The subscription module 324 manages subscriptions for clients. A subscription service includes, for example, adding, modifying or deleting a subscription for a client device. A subscription is a registration of one or more of the clients 228, 202, 204, 206, 208, 220, 230 to receive notifications in changes in the services provided by the CAS modules 324, 332, 334, 336, 338, 340, 350, 360. In one embodiment, the subscription service includes subscriptions to services available on the second server 250. A person having ordinary skill in the art will recognize that subscription services are possible. The subscription module 324 is communicatively coupled to the server 330 and the storage device 239. Subscription data that describes the different subscriptions for the clients is stored in the storage device 239. The subscription module 324 receives a CAS message from the server 330 and processes the message. For example, the CAS message requests a read operation or a write operation for the subscription data stored on the storage device 239. The subscription module 324 communicates with the storage device 239 to process the request included in the CAS message. The subscription data is described in more detail with reference to FIG. 4. The subscription module 324 is described in more detail with reference to FIGS. 13A and 13B.

The telephony module 332 communicates with the TAPI 218 to provide telephony services for clients. A telephony service is a conventional telephony service and includes, for example, placing a telephone call, parking a call, placing a call on hold, placing a conference call, etc. A person having ordinary skill in the art will recognize that other telephony services are possible. The telephony module 332 is communicatively coupled to the server 330 and the TAPI 218. A client (e.g., the PCM 202, the IP phone 228, a softphone (not pictured), etc.) sends a CAS message to the server 330 requesting a telephone call connection. The server 330 passes the CAS message to the telephony module 332. The telephony module 332 communicates with the TAPI 218 to connect the call. The TAPI 218 sends a message to the server 330 via signal line 330 indicating that the call is connected. In one embodiment, the server 330 sends a reply message to the client indicating that the call is connected. The telephony module 332 is described in more detail with reference to FIG. 12.

The directory module 334 communicates with the storage device 239 to provide a directory service to clients. A directory service is a conventional directory service and includes, for example, searching a directory database for a telephone number associated with a user specified by the client. The directory service can include, for example: (1) a system directory; (2) a personal directory; (3) distribution lists; (4) speed dials; (5) imported data; and (6) uploaded data. A person having ordinary skill in the art will recognize that other directory services are possible. The directory module 334 is communicatively coupled to the server 330 and the storage device 239. A client (e.g., the PCM 202) sends a CAS message to the server 330 requesting a directory service. The server 330 sends the CAS message to the directory module 334. The directory module 334 communicates with the storage device 239 to provide the requested service to the client. The server 330 sends a reply message to the client providing the requested service. The directory module 334 is described in more detail with reference to FIGS. 9A and 9B.

The configuration module 336 communicates with the storage device 239 to provide a configuration service to clients. A configuration service modifies or describes the configuration for a client. For example, a configuration services includes changing the configuration of a telephony device. A person having ordinary skill in the art will recognize that other configuration services are possible, including, for example, providing the client with information describing the current call handling mode for a client. The configuration module 336 is communicatively coupled to the server 330 and the storage device 239. A client (e.g., the PCM 202) sends a CAS message to the server 330 requesting a configuration service. The server 330 sends the CAS message to the configuration module 336. The configuration module 336 communicates with the storage device 239 to provide the requested service. The server 330 sends a reply message to the client providing the requested service. The configuration module 336 is described in more detail with reference to FIGS. 8A and 8B.

The voicemail module 338 communicates with the voicemail server 240 and the storage device 239 to provide a voicemail service to clients. A voicemail service is a conventional voicemail service and includes, for example, replaying voicemails that are stored in the storage device 239. A person having ordinary skill in the art will recognize that other voicemail services are possible. The voicemail module 338 is communicatively coupled to the server 330 and the voicemail server 240. A client (e.g., the PCM 202) sends a CAS message to the server 330 requesting a voicemail service. The server 330 sends the CAS message to the voicemail module 338. The voicemail module 338 communicates with the voicemail server 240 and the storage device 239 to provide the requested service. The server 330 sends a reply message to the client providing the requested service. The voicemail module 338 is described in more detail with reference to FIGS. 7A and 7B.

The call history module 340 communicates with the storage device 239 to provide a call history service to clients. A call history service is a convention call history service and includes providing a client with information indicating, for example, which calls have been placed, received and/or missed using a particular telephony device (e.g., and IP phone). This embodiment of call history is referred to herein as a device-based call history. In one embodiment, call history is tracked on a user-basis instead of a device-basis. For example, a user has one or more devices and one or more extensions, and the call history for each of these device(s) and extension(s) is tracked and recorded in a unified call history record. This embodiment of call history is referred to herein as a user-based call history. The call history module 340 is communicatively coupled to the server 330 and the storage device 239. A client (e.g., the PCM 202) sends a CAS message to the server 330 requesting a call history service. The server 330 sends the CAS message to the call history module 340. The call history module 340 communicates with the storage device 239 to provide the requested service. The server 330 sends a reply message to the client providing the requested service. The call history module 340 is described in more detail with reference to FIGS. 6A and 6B.

The presence module 350 communicates with the collaboration services device 274 to provide a presence service to clients. In one embodiment, the presence module 350 communicates with the telephony module 332 and the collaboration services device 274 to provide presence service to clients. In this embodiment, the presence module 350 is communicatively coupled to the collaboration services device 274 (as shown in FIG. 3), the storage device 239 (as shown in FIG. 3) and the telephony module 332 (not pictured in FIG. 3). In an alternative embodiment, the telephony module 332 is communicatively coupled to the collaboration services device 274 (not pictured in FIG. 3) and the presence module 350 is communicatively coupled to the storage device 239 and the collaboration services device 274. In another embodiment, one or more of the CAS modules 324, 332, 334, 335, 338, 340, 360, the CAS plug-in 255 and any other service provider work with the presence module 350 and the collaboration services device 274 to determine and provide presence data to the client device via the CAS 210.

A presence service is information indicating, for example, the availability of an individual user or a group of users on a network. The availability of a user or group of users on the network includes, for example, whether a device associated with a user or group of users is presently active on the network. In one embodiment, the availability of a user or group of users on the network includes a description of a type of activity taken by a user or group of users such as "on a call," "call on hold," "phone ringing," etc. The presence module 350 is communicatively coupled to the server 330 and the collaboration services device 274. A client (e.g., the web client 208) sends a CAS message to the server 330 requesting a presence service. The server 330 sends the CAS message to the presence module 350. The presence module 350 communicates with the collaboration service device 274 to provide the requested service. The server 330 sends a reply message to the client providing the requested service. The presence module 350 is described in more detail with reference to FIG. 10.

The instant messenger module 360 communicates with the collaboration services device 274 to provide an instant messaging service to clients. An instant messaging service is real-time direct text-based communication between two or more people using personal computers or other processor-based devices. The instant messenger module 360 is communicatively coupled to the server 330 and the collaboration services device 274. A client (e.g., the web client 208) sends a CAS message to the server 330 requesting an instant messaging service. The server 330 sends the CAS message to the instant messenger module 360. The instant messenger module 360 communicates with the collaboration service device 274 to provide the requested service. The server 330 sends a reply message to the client providing the requested service. The instant messenger module 360 is described in more detail with reference to FIGS. 11A and 11B.

In one embodiment, the CAS modules (i.e., modules 324, 332, 334, 336, 338, 340, 350, 360) are each hardware devices comprised of electronic circuit boards and/or firmware adapted to provide the functionality described above for the modules 324, 332, 334, 336, 338, 340, 350, 360. The individual hardware devices optionally comprise a processor and/or a non-transitory memory that stores codes and routines such as the firmware. In another embodiment the various modules 324, 332, 334, 336, 338, 340, 350, 360 are codes and routines stored on one or more non-transitory memories and configured to provide the functionality described above for the modules 324, 332, 334, 336, 338, 340, 350, 360 when executed by a processor (not pictured). For example, the modules 324, 332, 334, 336, 338, 340, 350, 360 are one or more applications stored in a memory of a computer (not pictured) and executed by a processor (not pictured) comprised within the computer.

Storage Device 239

Figure 4:
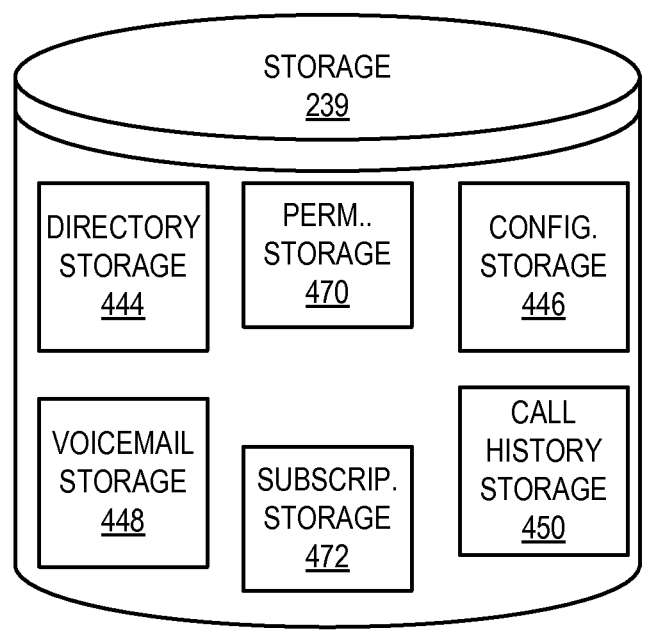
FIG. 4 is a diagram illustrating a storage device according to one embodiment of the present invention.

FIG. 4 depicts a storage device 239 according to one embodiment. The storage device 239 is a non-transitory computer-readable storage medium storing data and information used by the CAS 210 to provide the functionality of the CAS 210 described above. The storage device 239 comprises: a directory storage 444; a configuration storage 446; a voicemail storage 448; a call history storage 450; a permission storage 470; and a subscription storage 472. The directory storage 444, configuration storage 446, voicemail storage 448, call history storage 450, permission storage 470 and the subscription storage 472 each store data and information necessary for the directory module 334, the configuration module 336, voicemail module 338, call history module 340 and subscription module 324, respectively, to provide the functionality described above for each with reference to FIG. 3. In one embodiment, the directory storage 444, configuration storage 446, voicemail storage 448, call history storage 450, permission storage 470 and the subscription storage 472 each store data and information necessary for the directory module 334, the configuration module 336, voicemail module 338, call history module 340 and subscription module 324 comprise one or more searchable databases that can be accessed by the associated CAS modules to provide a service for a client. In one embodiment, the databases are comprised within one or more persistent and/or volatile memory devices (e.g., flash, RAM, hard drive, etc).

Although only one storage device is depicted in FIG. 4, a person having ordinary skill in the art will recognize that in one embodiment there are more than one storage devices 239 communicatively coupled to the CAS 210 and that each one comprises one or more of the directory storage 444, configuration storage 446, voicemail storage 448, call history storage 450, permission storage 470 and the subscription storage 472. One skilled in the art will also recognize that in one embodiment the different storages 444, 446, 448, 450, 470, 472 and the data they comprise are stored in different devices on the server-side 194 on the system 295. For example, the voicemail storage 448 is stored on a memory that comprises the voicemail server 240.

Methods and Examples

Figure 5A:
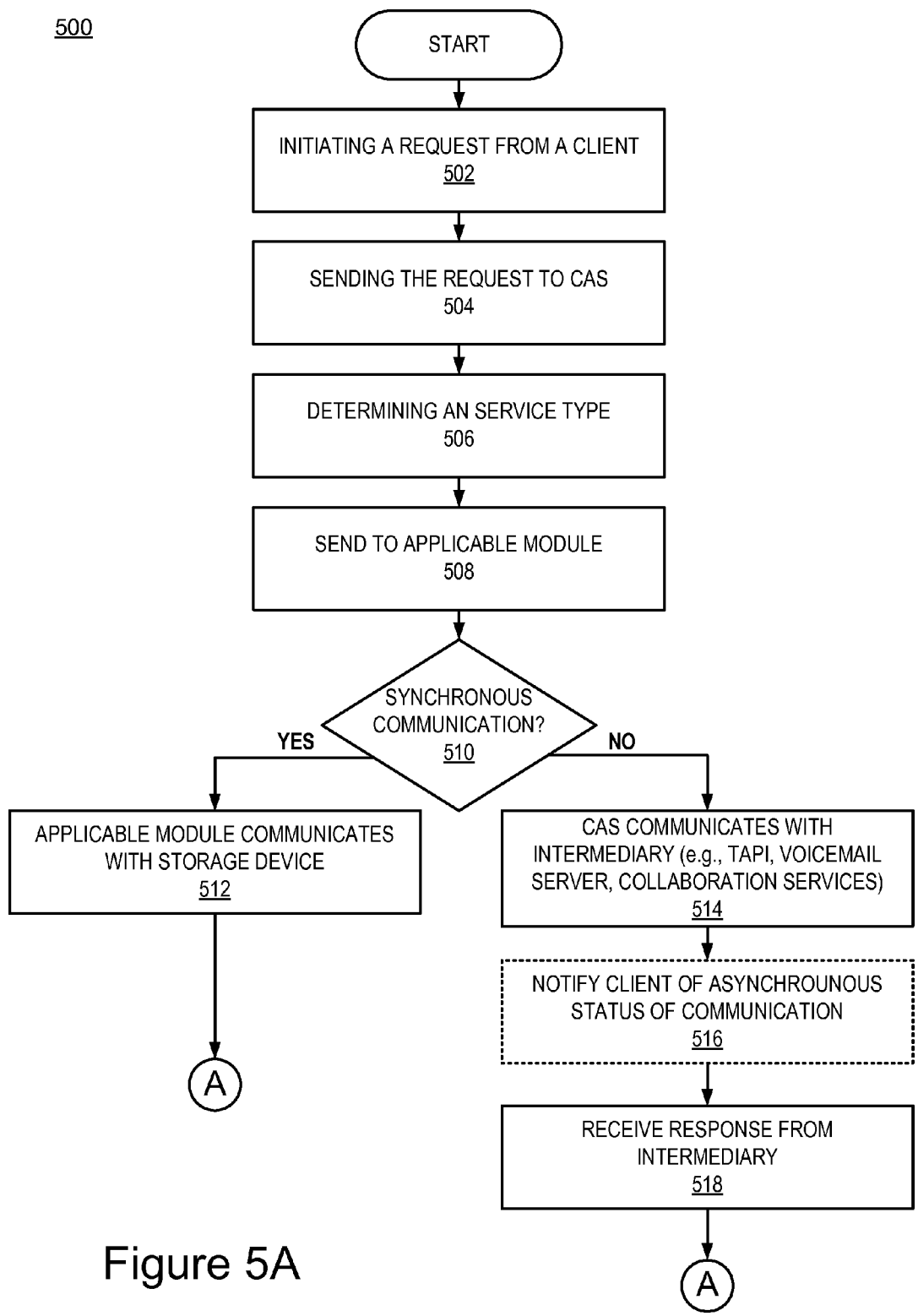
FIGS. 5A and 5B are a flowchart illustrating a general method performed by the client application server to answer requests received from clients according to one embodiment of the present invention.
Figure 5B:
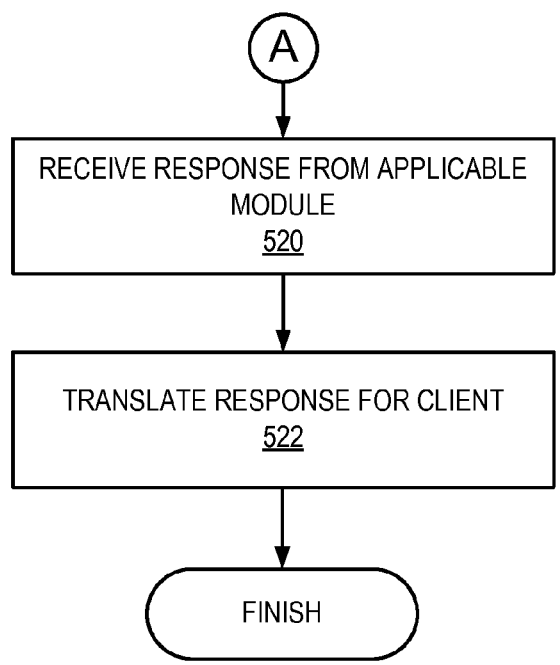

FIGS. 5A and 5B depict a method 500 according to one embodiment of the present invention. A client initiates 502 a request for a service. For example, a client generates message including a request for a telephony service, voicemail service, etc. This message is referred to herein as request message or mobile device message. The client sends 504 the request message to the CAS 210, protocol adapter 230 or server-side web client 220 via the network 190. For example, one of the IP phone 228, PCM 202, email client 204 and client-side web client 208 send 504 a request message (formatted as a CAS message) to the CAS 210. Alternatively, the MCM 206 sends 504 a mobile device message to the protocol adapter 230 and the protocol adapter 230 generates a CAS message and the protocol adapter 230 sends 504 the CAS message to the CAS 210. In another alternative example, the client-side web client 208 sends 504 a message to a server-side web client 220 and the server-side web client 220 sends an equivalent CAS message to the CAS 210. The CAS 210 receives the CAS message and the server 330 determines 506 a service type for the CAS message. For example, the server 330 determines 506 which service the client is requesting based on information included in the message. In one embodiment, the server 330 sends 508 the CAS message to one of the various modules comprised within the CAS 210 (e.g., modules 324, 332, 334, 336, 338, 340, 350, 360). In another embodiment, the server 330 sends 508 the CAS message to one of the various modules comprised within the CAS 210 (e.g., modules 324, 332, 334, 336, 338, 340, 350, 360) based the determined service type. In other words, the server 330 sends 508 the message to the CAS module 324, 332, 334, 336, 338, 340, 350, 360 that provides the service determined in step 506. For example, the action type is a telephony service and the server 330 sends the CAS message to the telephony module 330. In another embodiment, the server 330 sends 508 the CAS message to one of the various modules comprised within the CAS 210 (e.g., modules 324, 332, 334, 336, 338, 340, 350, 360) based on a user input or any other instruction received from the client device (e.g., clients 228, 202, 204, 206, 208, 220, 230). In one embodiment, the CAS modules 324, 332, 334, 336, 338, 340, 350, 360 are referred to as service providers.

At step 510 the server 330 determines 510 if the CAS 210 communicates synchronously or asynchronously with the service provider. A determination that the CAS 210 communications synchronously occurs if the CAS 210 does not need to communicate with an intermediary to provide the client with the requested service. A determination that the CAS 210 communications asynchronously occurs if the CAS 210 communicates with an intermediary to provide the client with the requested service. An intermediary is the TAPI 218, the voicemail server 240 or the collaboration service device 274.

In one embodiment, step 510 is performed by one or more of the CAS modules 324, 332, 334, 336, 338, 340, 350, 360.

If a determination is made at step 510 that the CAS 210 communicates synchronously, then at step 512 the applicable module from step 508 communicates with the storage device 239 to provide the requested service. In one embodiment, the applicable module interfaces with middleware in order to communicate with the storage device 239 and provide the client with the requested service. Referring now to FIG. 5B, the server 330 receives 520 a response from the applicable module. The server 330 translates 522 the response for the client. For example, the server 330 translates 522 the response to a HTTP message encoded according to JSON or XML. The server 330 then sends the response to the client.

Referring back to FIG. 5A, if a determination is made at step 510 that the CAS 210 communicates asynchronously, then at step 514 the applicable module from step 508 communicates with the intermediary. Since asynchronous communication requires more time to provide the requested service to the client, at step 516 the server 330 alternatively sends a message to the client informing the client that asynchronous communication is occurring. For example, the message informs the human user of the client that providing the requested service will take additional time. In one embodiment, this message is encoded in JSON, XML or a similar coding language. In one embodiment, this message includes an identifier (e.g., an integer used as an identifier) that is later used to identify the reply message received from the CAS 210. For example, the client is an HTTP-based client that receives the message and the identifier. The client stores the identifier. After a period of time, the client receives the reply message from the CAS 210 and determines that the reply message corresponds to the identifier. In one embodiment, the above-described identifier is for clients having protocols that do not already contain a way to match up a request with a response. A person having ordinary skill in the art will recognize that HTTP-based clients already includes the functionality of the identifier (i.e., HTTP-based clients can match up requests with responses), so, in one embodiment the above-described identifier is implemented for clients that use a protocol that does not have the functionality of the identifier and cannot match up requests with responses.

The applicable module receives 518 the response from the intermediary. Referring back to FIG. 5B, the server 330 receives 520 a response from the applicable module 520. The server 330 then translates 522 the response for the client. For example, the response is translated to an HTTP message encoded using JSON (or XML, etc.). In one embodiment, the translated response includes the identifier (e.g., integer) described above with reference to step 516.

In one embodiment, the client logs in to the CAS 210 prior to requesting a service. For example, the CAS 210 has one or more threads that receive requests from a client (i.e., a thread pool). The individual threads that comprise the thread pool process individual requests from individual clients. For example, the server 330 assigns a first thread from the thread pool to log the client into the CAS 210 and process request messages received from the client. In one embodiment, when assigning a first thread, the server 330 does not make a distinction between a request for a service received from a client and a request for an event. The server 330 also does not make a distinction between which threads handle requests for a service and which threads handle requests for retrieving events. Instead, the server 330 assigns a second thread from the thread pool to run an event loop that waits for request messages from the client and dispatches reply messages after the request messages are processed. In one embodiment, the first thread also performs the function of the second thread.

In another embodiment, from the client perspective the two threads are: (1) one thread logs the client into the CAS 210 and sends request messages to the client; and (2) the second thread runs an event loop that sends request messages to the CAS 210 (or protocol adapter 230 or web client 220) and waits for reply messages responsive to the request messages.

In a different embodiment, the client is a web client 208. The web client 208 communicates with CAS 210 on two threads from the thread pool. At any given time the web client 208 uses a first thread to make a GetEvent request to the CAS 210. The web client 208 uses a second thread to either (1) make a request for a service from the CAS 210 or (2) wait to receive an input (e.g., a input received from a human user of the web client 208) to initiate a service request from the CAS 210. The GetEvent request is described in further detail in the provisional application having Ser. No. 61/365,262, the entirety of which is incorporated by reference in this application (referred to herein as "the priority application").

In one embodiment, the CAS 210 has a general pool of threads that process requests from clients. Threads are not assigned to any particular client, and no distinction is made between clients in terms of choosing threads from the thread pool. In other words, all the threads in the general thread pool can handle requests from any client. This is advantageous in that the server 330 does not need one thread per client, which makes the CAS 210 scale up more efficiently.

In yet another embodiment, the client is a thick client. Specifically, one or more of the IP phone 228, PCM 202, email client 204 and MCM 206 are a thick client. For example, the MCM 206 is a thick client and is an element of a smartphone. A thick client is known to those having skill in the art. The thick client uses a first thread to make a GetEvent request to the CAS 210. The thick client uses a second to log in to the CAS 210 and make service requests to the CAS 210.

In one embodiment, one or more of the first thread and the second thread is a dedicated thread.

In one embodiment, the response described with reference to steps 520 and/or 522 includes permission data. Permission data is data that specifies what actions the client can take with the provided service. For example, if the client requests a call history service (user-based and/or device based), the CAS 210 returns a response to the client at step 522 that includes permission data that specifies what actions the client can take on call history entries returned to the client using the call history service. For example, the permission data specifies whether the call history entries included in the history service can be deleted, or whether notes included on the history entry can be updated. In one embodiment, the permission data is applied to individual history items, or the call history service as a whole (e.g., the client is not permitted to request a call history service). A person having ordinary skill in the art will recognize that other actions are possible for the above-described call history service. Accordingly, the client has a record of the tasks that can be performed for any service. For example, the client comprises a non-transitory memory (e.g., flash) and stores a record of the permission data on the memory. In one embodiment, if the permissions for a service change, CAS 210 sends a message to the client updating the permission data so that the client has real-time permission data. In one embodiment, the client does not offer the user the option of performing steps that exceed the scope of the permission for any given service. For example, if the permission for a history service does not permit the client to delete a history entry, the client is not provided with a menu option at the client device that would request deletion of the history entry. As a result, in one embodiment, the CAS 210 does not have the undesirable requirement of sending error messages to the client devices when they make a request that exceeds the scope of permission granted to the client. In another embodiment, the CAS 210 sends error messages to certain clients that are not designed and/or configured according to the specifications of the CAS 210 (referred to herein as "other-specification-based clients") when these other-specification-based clients make a request that exceeds the scope of permission granted to the client.

In another example of permission data, a client is a web client 208 and requests a telephone call. The CAS 210 returns a reply message to the web client 208 that includes, among other things, data specifying a state of the call, the parties on the call, and the way the call was constructed. In one embodiment, the data additionally provides information to the client on precisely what actions the client has permission to take on that call, such as answer, hold, drop, transfer, conference, begin a data conference based on the call, park, etc, as the call state changes, or additional parties are added to the call, CAS 210 keeps the client apprised of the changes in which actions are allowed via events sent to the client.

Accordingly, in one embodiment permissions are centralized on CAS 210 and pushed out to clients as permission data included with messages sent by CAS 210 to the clients. Centralizing permissions on the CAS 210 as described above beneficially enables, among other things, a dynamic and more reliable way of providing permissions to client devices. For example, other telephony systems (e.g., system 195) provide static permissions to client devices that do not reflect the real-time status of permissions. The permission data provided by the CAS 210 beneficially enables the client to receive real-time status of permissions since CAS 210 provides updated permission data with each request. Centralizing permissions on the CAS 210 also beneficially enables, among other things, easier client authoring since the client does not need to contain logic to determine which actions the client can take (this information is being provided by the CAS 210 in one embodiment), and enables a configuration where the CAS 210 has access to all the information required for determining permissions (clients do not have this information centrally stored, and have to be configured with error-prone code in order to determine permissions). Another benefit of the above-described embodiment is that human users of clients will not expect to receive as many error messages. Other benefits will be apparent to one having skill in the art. The permission data will be described in more detail below with reference to FIGS. 6-15.

In one embodiment, permission data limits the scope of features for a service that can be provided to a client. For example, whether a user can retrieve all of a call history. In another embodiment, permission data limits access to the service itself. For example, whether a user can request any call history service.

Figure 6:
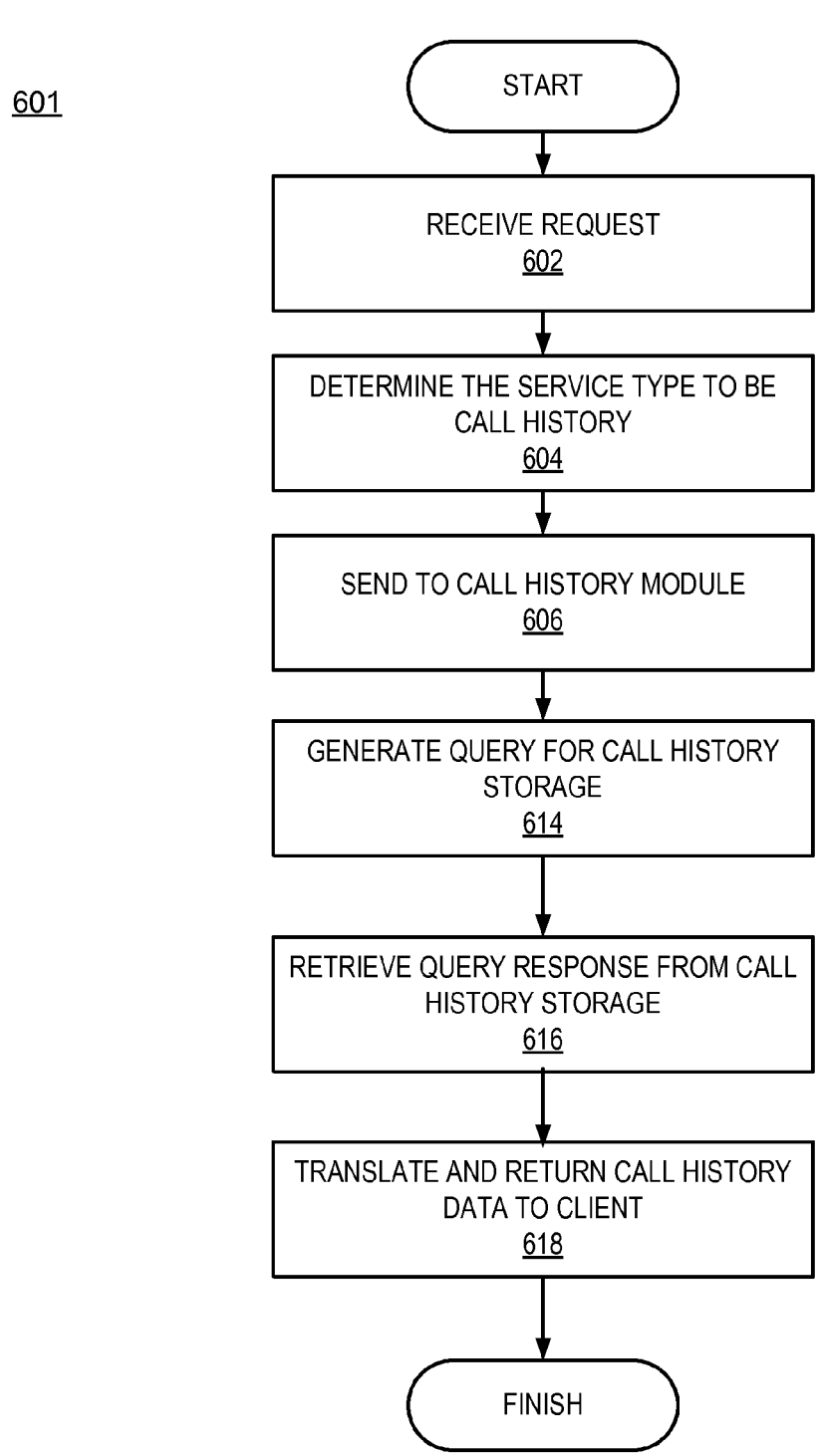
FIG. 6 is a flowchart illustrating a method performed by the client application server to provide a call history service according to one embodiment of the present invention.

FIG. 6 depicts a method 601 for providing a call history service to a client according to one embodiment of the present invention. The client initiates a request for a call history service. For example, the client is an IP phone 228. A human user of the client provides inputs indicating that a call history service is requested. The IP phone 228 generates a CAS message requesting the call history service. The server 330 receives 602 the request. For example, the server 330 receives 602 the CAS message generated by the IP phone 228. The server 330 determines 604 that the message is requesting a call history service. The server 330 sends 606 the request to the call history module 340. The call history module 340 generates 614 a query for the call history storage 450. For example, the call history storage 450 is a database (or memory such as flash, RAM, etc.) comprised within the storage device 239 that includes the call history for a telephony device such as an IP phone 228 or a softphone. The call history module 340 retrieves 616 a response to the query. For example, the call history module 340 sends the query to the call history storage 450 configured to retrieve the call history for the client device (either user-based call history or device-based call history). The call history storage 450 receives the query and executes the query on the call history database. The call history storage 450 generates an answer to the query and sends the answer in a response message back to the call history module 340. The call history module 340 receives the response to the query from the call history storage 450. The call history module 340 sends the response message to the server 330 and the server 330 translates 618 the response for the client. For example, the server 330 translates the message to an HTTP message encoded according to JSON (or XML, or some similar encoding format). The translated response includes the requested call history data (e.g., call history entries). The server 330 sends the translated message to the client.

In one embodiment, as described above with reference to FIG. 5B (steps 520 and 522), the response sent to the client at step 618 includes permission data describing what actions the client can take on call history data returned to the client using the call history service (e.g., whether the call history entries included in the history service can be deleted, or whether notes included on the history entry can be updated).

Figure 7A:
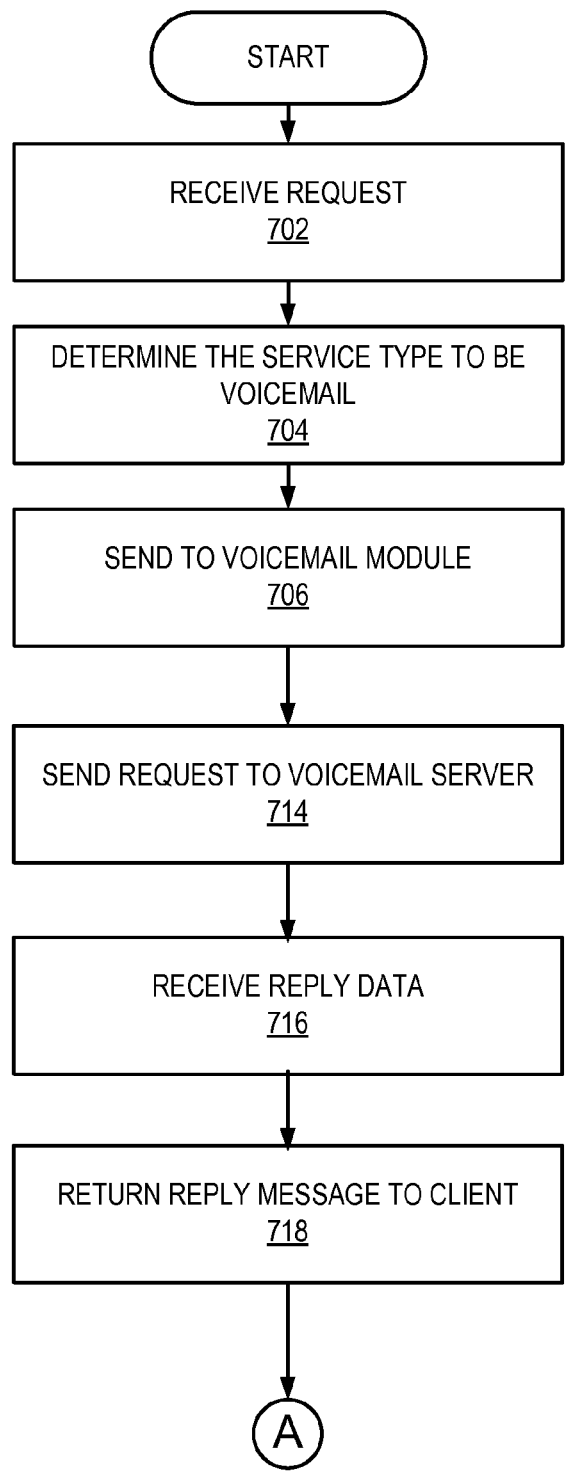
FIGS. 7A and 7B are a flowchart illustrating a method performed by the client application server to provide a voice mail service according to one embodiment of the present invention.
Figure 7B:
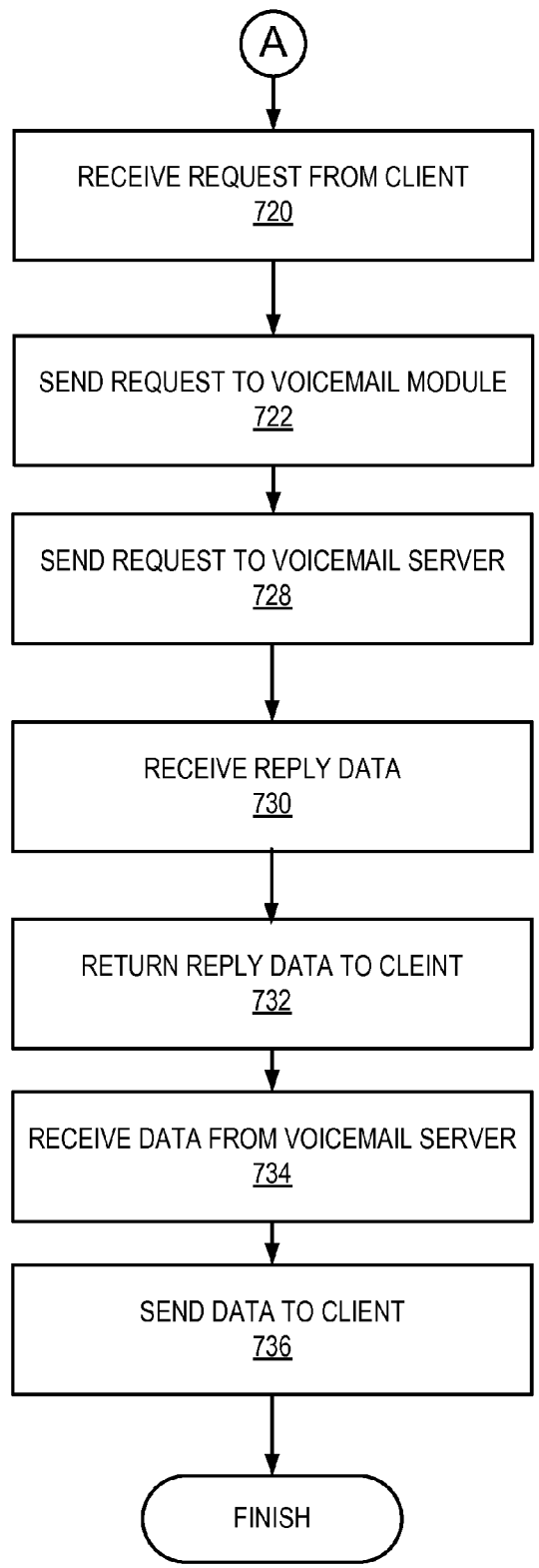

FIGS. 7A and 7B depict a method 701 for providing a voicemail service to a client according to one embodiment of the present invention. The client initiates a request for a voicemail service. For example, the client is an IP phone 228. A human user of the client provides inputs indicating that a voicemail service is requested. The IP phone 228 generates a CAS message requesting the voicemail service. This CAS message is referred to herein as a first voicemail request message. The server 330 receives 702 the first voicemail request message. For example, the server 330 receives 702 the CAS message generated by the IP phone 228. The server 330 determines 704 that the first voicemail request message is requesting a voicemail service. The server 330 sends 706 the first voicemail request message to the voicemail module 338. The voicemail module 338 sends 714 a request to the voicemail server 240. For example, the voicemail module 338 sends a message to the voicemail server 340 requesting the voicemail server 340 to provide a list of voicemails stored in the storage device 239. The voicemail server 340 retrieves the requested voicemail data from the voicemail storage 448 and sends a reply to the voicemail module 338 that includes the requested voicemail data (referred to herein as "voicemail reply data"). The voicemail data includes the list of voicemails. The list of voice mails includes, among other things, the names of senders, the telephone number of senders, the subject of the voicemail, the time the message was received, the message size (e.g., in bytes) and the message unique identifier ("UID"). A person having skill in the art will recognize that in one embodiment the list of voicemails includes additional information not listed here.

The voicemail module 338 receives 716 the voicemail reply data from the voicemail server 240. The voicemail module 338 generates and sends a message to the server 330 including the voicemail reply data. The server 330 translates the message received from the voicemail module 338 for the client. For example, the server 330 translates the message to an HTTP message encoded according to JSON. This message is referred to herein as the first voicemail reply message. The first voicemail reply message includes the voicemail reply data. The server 330 sends 718 the reply message to the client.

In one embodiment, the voicemail reply data also includes permission data that specifies what actions the client can take with the voicemail service. For example, the permission data specifies that the client can perform one or more of the following actions: (1) reply to the voicemail message; (2) forward the voicemail message; and (3) edit the subject of the voicemail message. Persons skilled in the art will recognize that the permission data can regulate other actions not listed here. In one embodiment, these permissions are kept up to date by CAS 210 via events and/or messages sent by CAS 210 to the client. For example, if an administrator of CAS 210 changes the permissions, the CAS 210 sends a message to the client updating the permission data.

In one embodiment, permission data is not sent with reply messages for voicemail service requests. In this embodiment the client itself is configured so that the client only performs a limited number of options for how voicemail data is used, and the client only provides options to the user that are consistent with these options. Similar clients are described in U.S. patent application Ser. No. 12/415,586, the entirety of which is hereby incorporated by reference. For example, the client is a IP phone 228 that is configured so that voicemail data is always played over the speaker of the IP phone 228. The client only provides the user with input options (i.e., buttons and/or a user interface) that are consistent with this configuration (i.e., inputs are only provided for playing the voicemail data over the speaker of the IP phone 228). In another example, the client is an MCM 206 stored on a smartphone and the client only supports playing the voicemail data back over the speaker of the smartphone, and this is the only option presented to the user of the client. For example, the smartphone only has one button for playback of voicemails, and this button is only configured to playback the voicemail over the speaker of the mobile phone. In yet another example, the client is a PCM 202 stored as an element of a personal computer and the client supports playing the voicemail data back over a set of speakers that are communicatively coupled to the personal computer or playing the voicemail data back over the IP phone 228 that is communicatively coupled to the client PCM 202. For example, the PCM 202 generates a graphical user interface displayed on a monitor communicatively coupled to the personal computer and the graphical user interface has two buttons for playback of voicemails. A first button is only configured to playback the voicemail over the speakers communicatively coupled to the personal computer. A second button is only configured to playback the voicemail over the IP phone 228 communicatively coupled to the personal computer. A person having ordinary skill in the art will recognize that other options for voicemail data are possible that are still consistent with the description for this embodiment.

Turning to FIG. 7B, the server receives 720 a second message from the client. For example, the second request includes data indicating that a user desires to play a selected voicemail message. The second message is referred to herein as the second voicemail request message. The server 330 sends 722 the second voicemail request message to the voicemail module 338. At step 728 the voicemail module 338 sends a request to the voicemail server 240 for the requested service. The voicemail server 240 receives the request and processes the request to retrieve data from the voicemail storage 448 responsive to the second voicemail request message. For example, the second voicemail request message includes data for playing the selected voicemail. The voicemail storage 448 is a storage device (e.g., a database stored on a hard drive, flash or other non-transitory memory) that includes, for example, stored voicemails for the client device. The voicemail server 240 generates a query and retrieves the selected voicemail from the voicemail storage 448. The voicemail server 240 sends the retrieved data to voicemail module 338. The voicemail module 338 receives 730 the data and sends the data to the server 330 in a message. The server 330 receives the message translates the message for the client and sends 732 the translated message to the client. This message is referred to as the second voicemail reply message. At step 734 the voicemail module 338 receives data from the voicemail server 240 when an action is about to take place (e.g. the message is about to be played). The voicemail module 738 sends the data to the server 330 in a message. The server 330 receives the message translates the message for the client and sends 736 the translated message to the client. The 736 voicemail data provides the client with the requested service. For example, the user of the client listens to selected using the IP phone 228 when the voicemail data is received 736.

In one embodiment, the second voicemail reply message includes additional permission data that specifies what actions the client can perform on the data that comprises the voicemail. The additional permission data specifies, for example, how the client can access the data that comprises the voicemail. For example, whether the client has the option to download the voicemail message media to a device and/or play the voicemail message over a telephone or IP phone. Persons skilled in the art will recognize that the permission data can regulate other actions not listed here. In one embodiment, these permissions are kept up to date by CAS 210 via events and/or messages sent by CAS 210 to the client. For example, if an administrator of CAS 210 changes the permissions, the CAS 210 sends a message to the client updating the permission data.

In one embodiment, if the client requests that the voicemail data is to be played back on the client device (e.g., IP phone 228), the voicemail module 338 communicates with the voicemail server 240 to send request that the voicemail server 240 play the selected voicemail message. The voicemail server 240 receives the request to play a selected voicemail message and establishes a connection to the client (e.g., the IP phone 228). The voicemail server 240 receives the request to play the selected voicemail message and establishes a connection to the client. The voicemail server 240 notifies the voicemail module 338 that the message is about to be played and starts playing the message for the client. When the voicemail module 338 receives the notification that the message is about to be played from the voicemail server 240, it sends an event to the client notifying it that the message is starting to play.

In another embodiment, the client (e.g., PCM 202) sends a request to CAS 210 that the voicemail data be downloaded. In one embodiment, the downloaded voicemail data is played via speakers present at the client. For example, the client sends a request to the CAS 210 indicating that the client wants to download a specific message. The server 330 sends the request to the voicemail module 338 which sends the request to the voicemail server 240. In one embodiment, the voicemail module 338 sends a response to the client indicating the request has been received. The voicemail server 240 communicates with the storage 239 and prepares the selected voicemail message to be downloaded by the client. The voicemail server 240 downloads the voicemail data to the storage 239. When the message is ready to be downloaded, the voicemail module 338 is notified by the voicemail server 240 and sends an event to the client indicating the location of the message that can be downloaded (e.g., the storage 239). The client can then download the message to a local memory and play the message using an application configured for this purpose.

In one embodiment, the voicemail module 338 saves the voicemail data received at step 716 described with reference to FIG. 7A. For example, the voicemail module 338 saves the voicemail data in the storage 239. In one embodiment, the voicemail module 338 saves the voicemail data and the permission data. The client then sends a third request to the CAS 210. The third request includes, for example, a request for the list of voicemails included in the voicemail data. The third request is not depicted in FIG. 7A or 7B, but will be understood to one having ordinary skill in the art as occurring between steps 716 and 718. The third request is referred to herein as a "third" request, not because it comes after the first request or the second request described above with reference to FIGS. 7A and 7B, but instead to distinguish the content of the third request from the content of the first and second request, i.e., the actual data and/or service that is being requested from the CAS 210. After receiving the third request, the method moves on to step 718 and continues as described above for FIGS. 7A and 7B.

Figure 8A:
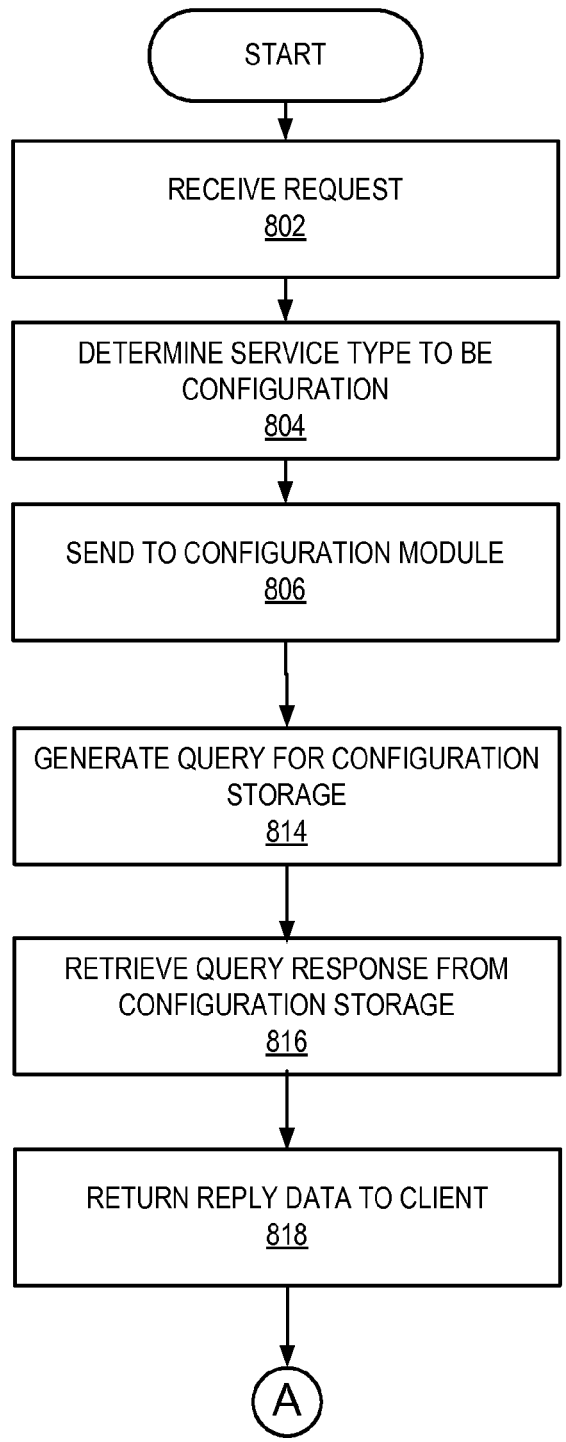
FIGS. 8A and 8B are a flowchart illustrating a method performed by the client application server to provide a configuration service according to one embodiment of the present invention.
Figure 8B:
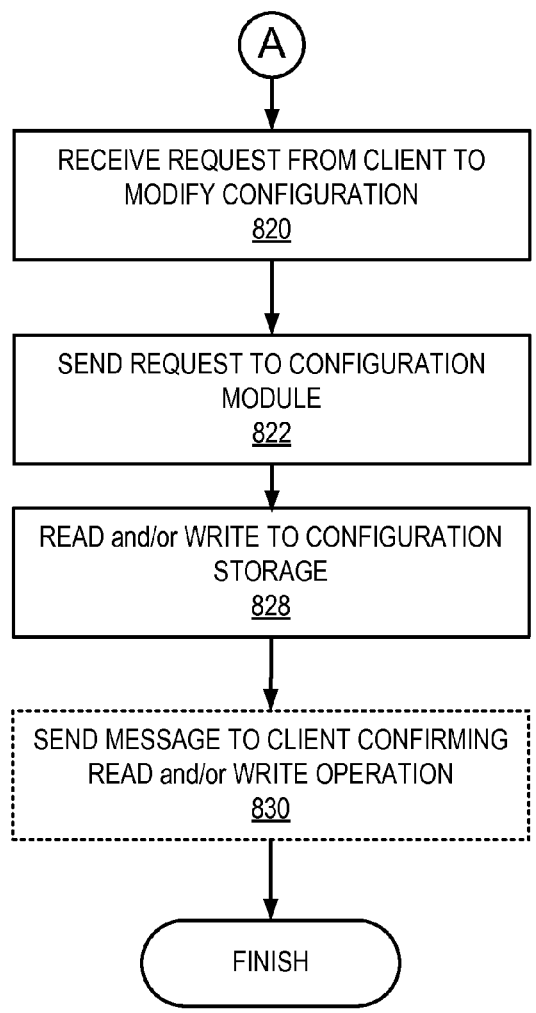

FIGS. 8A and 8B depict a method 801 for providing a configuration service to a client according to one embodiment of the present invention. The client initiates a request for a configuration service. For example, the client is an IP phone 228. A human user of the client provides inputs indicating that a configuration service is requested. For example, the IP phone 228 requests call handling settings for a client device (such as the IP phone 228) and then (at a later time) requests a modification to these call handling settings. The call handling settings include one or more of the following: (1) standard; (2) in a meeting; (3) out of office; (4) extended absence; and (5) customized call handling mode. The user of the client has the ability to change which of these modes is their active mode and/or change the details of how calls are handled by any of these five modes by using the client to make request(s) to the CAS 210. The client may send request messages to the CAS 210 to access and/or configure (i.e., change) one or more of the following: (1) which of the five call handling modes is currently the active call handling mode; (2) whether the user is allowed to switch call handling modes (or, alternatively, whether an administrator is required to switch modes); (3) the details of how calls are handled (e.g., among other things, whether calls are forwarded, where the calls are forwarded, the number of rings before a call is forwarded, etc.); and (4) whether the user is allowed to modify the details of how calls are handled (or, alternatively, whether an administrator is required modify the details of how calls are handled). In one embodiment, a user is also an administrator.

At step 802, the server 330 receives a CAS message including a request for a user's call handling settings. This message is referred to herein as the first configuration request message. The message is generated by a client such as the IP phone 228. The server 330 determines 804 that the first configuration request message is requesting a configuration service. The server 330 sends 806 the message to the configuration module 336. The configuration module 336 generates 814 a query for the configuration storage 446. For example, the client device is a IP phone 228 and the configuration storage 446 is a database comprised within the storage device 239 that includes data describing the call handling settings for the IP phone 228 (or a user of the IP phone 228). In one embodiment, the call handling settings includes a menu of modifications that can be made to the call handling settings. The menu is based in part on permission data. For example, the menu options only include modifications that are within the permission boundaries for the user and/or client device. The configuration module 336 retrieves 816 a response to the query. For example, the configuration module 336 sends the query to the configuration storage 446. The configuration storage 446 receives the query and executes the query on the configuration database. The configuration storage 446 generates an answer to the query and sends the answer in a response back to the configuration module 336. The answer includes data responsive to the client request. The configuration module 336 receives the answer to the query from the configuration storage 446. The configuration module 336 sends the answer to the server 330 and the server 330 translates the answer. For example, the server 330 translates the answer to an HTTP message encoded according to JSON. This message includes the retrieved configuration data and is referred to herein as the first configuration reply message. In one embodiment, the answer also includes permission data. The server 330 sends the first configuration reply message to the client.

Turning to FIG. 8B, the server 330 receives 820 a second configuration request message from the client. For example, the second configuration request message includes the data indicating a user selection made from the configuration menu sent to the client in the first configuration reply message. In this example, the user requests a change to the call handling mode for the IP phone 228, which is an example of a write operation to be performed on the configuration database. Since the configuration menu included a menu option for changing the call handling mode, the permission data described above with reference to step 818 included data indicating that the user has permission to modify the call handling mode of the client device. If the user did not have this permission, the option to modify the call handling mode of the client device would not have been present in the configuration menu. The server 330 sends 822 the second configuration request message to the configuration module 336.

At step 828 the configuration module 336 performs the write operation 828 requested by the client. For example, the configuration module 336 modifies the configuration data by writing new configuration data to the configuration database 446. The call handling mode for the client device is now changed. Optionally, at step 830 the server 330 sends a message to the client confirming that the write operation occurred. Step 830 is depicted with a dashed line to indicate that it is an optional step of method 801.

Figure 9:
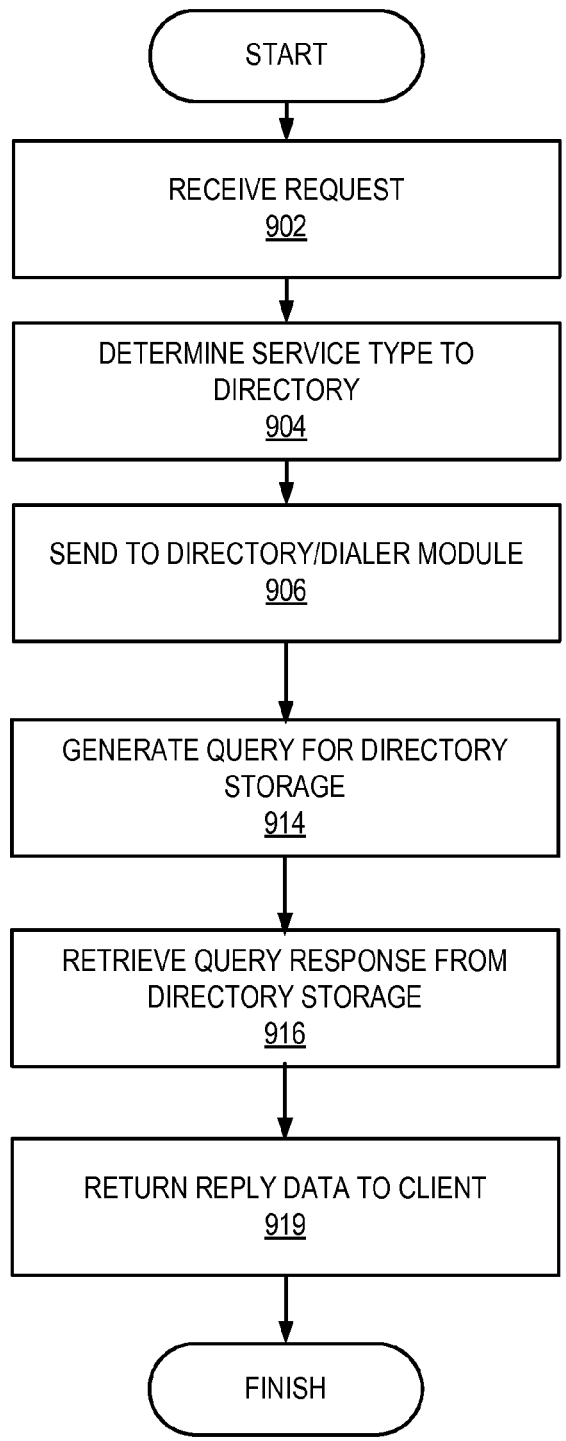
FIG. 9 is a flowchart illustrating a method performed by the client application server to provide a directory service according to one embodiment of the present invention.

FIG. 9 depicts a method 901 for providing a directory service to a client according to one embodiment of the present invention. The client initiates a request for a directory service. For example, the client is a PCM 202 operated on a personal computer. A human user of the client provides inputs indicating that a directory service is requested. For example, the user requests a directory service that provides the PCM 202 with a directory. The client can request a whole or partial directory listing. For example, the client device requests a listing of any number of contacts in the directory who have names that start with the case-sensitive string "To." The PCM 202 generates a CAS message requesting the directory service. This message is referred to herein as the first directory request message. The server 330 receives 902 the first directory request message. For example, the server 330 receives 902 the CAS message generated by the PCM 202. The server 330 determines 904 that the first directory request message is requesting a directory service. The server 330 sends 906 the message to the directory module 334. The directory module 334 generates 914 a query for the directory storage 444. For example, the client device is a IP phone 228 and the directory storage 444 is a database comprised within the storage device 239 that includes data describing directory listings. The directory module 334 retrieves 916 a response to the query. For example, the directory module 334 sends the query to the directory storage 444. The directory storage 444 receives the query and executes the query on the directory database. The directory storage 444 generates an answer to the query and sends the answer in a response back to the directory module 334. The response includes data responsive to the client request. For example, the response includes data describing a listing of contacts in the directory having names that start with the case-sensitive string "To." The directory module 334 receives a response to the query from the directory storage 444. The directory module 334 sends the response to the server 330. The response includes the data describing the requested directory listing. The server 330 translates the response to form the first directory reply message. For example, the server 330 translates the response to an HTTP message encoded according to JSON. The first directory reply message includes the requested data describing the requested directory listing. In one embodiment, the first directory reply message includes permission data specifying actions that can be performed on the directory listing. The server 330 sends 919 the first directory reply message to the client.

Figure 10:
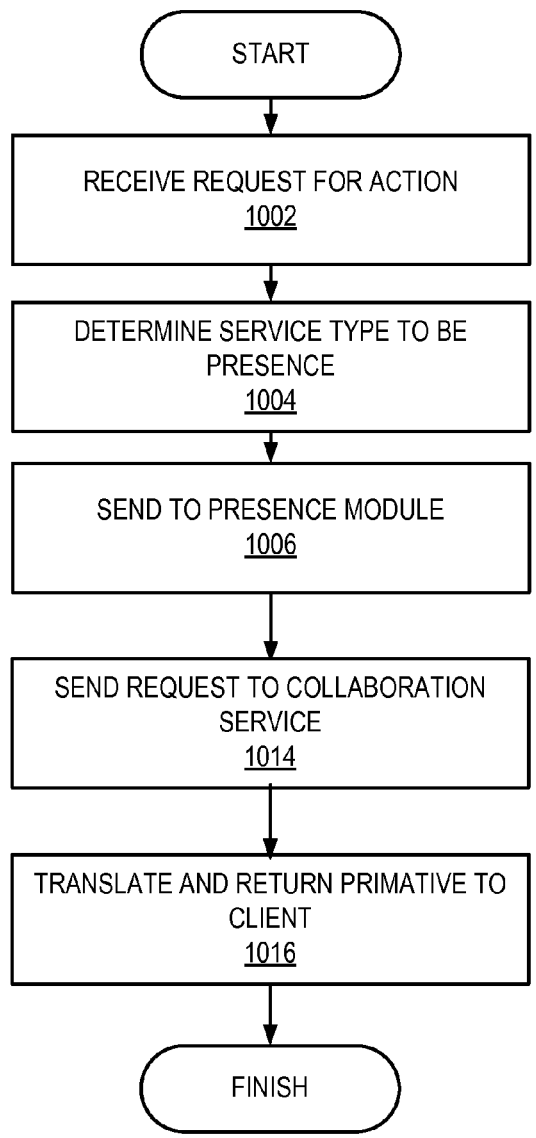
FIG. 10 is a diagram illustrating a method performed by the client application server to provide presence service according to one embodiment of the present invention.

FIG. 10 depicts a method 1001 for providing a presence service to a client according to one embodiment of the present invention. The client initiates a request for a presence service. For example, the client is a web client 208 operated on a personal computer. A human user of the client provides inputs indicating that a presence service is requested. For example, the user requests that directory listings (as described above for FIG. 9) be returned with the presence status of the users that comprise the directory listing. The web client 208 generates a CAS message requesting the presence service. This message is referred to herein as the presence request message. The server 330 receives 1002 the presence request message. For example, the server 330 receives 1002 the CAS message generated by the web client 208. The server 330 determines 1004 that the message is requesting a presence service. The server 330 sends 1006 the presence request message to the presence module 350. The presence module 350 receives the presence request message and subscribes the client to receive presence data with requested directory listings and updates of presence status for the entries in the directory listing. This subscription is stored by the presence module 350 in the subscription storage 472. At a later time, the client requests a directory listing as described above for FIG. 9. Referring now to FIG. 9, the directory module 334 optionally checks the subscription storage 472 prior to step 919. For example, after retrieving the directory listing from the directory storage 444 at step 916, the directory module 334 checks the subscription storage 472 to determine if the client is subscribed to receive presence data with the directory listing. Subscriptions are described in further detail with reference to FIGS. 13A and 13B. Referring now back to FIG. 10, the presence module 350 generates 1014 a request for a presence service for the client to the collaboration services device 274. For example, the presence module 360 requests the presence status of the users in the directory listing. The collaboration services device 274 receives the request and returns a presence primitive to the presence module 350. The presence primitive is a primitive describing the presence status of a number of users. For example, the presence primitive describes the presence status of the users in the directory listing. The presence module 350 receives the presence primitive and sends it to the server 330 in a message. The server 330 translates the message into a CAS message referred to as the presence reply message. The server 330 sends the presence reply message to the client. The presence reply message includes the presence primitive. In one embodiment, the presence module 360 communicates with the directory module 334 to send the presence primitive to the client in a message that includes a requested directory service. For example, the message includes a directory listing that includes the presence status of the users included in the directory listing.

In one embodiment, the initial request for presence service described with reference to step 1002 includes a request for updates on the presence status of users. For example, and as a continuation of the example described above where presence status is provided with a directory listing, the user requests real-time updates on the presence status of the users included in the directory listing. The CAS 210 monitors the presence status of users and sends update messages to the client when the presence status of the users changes. For example, the CAS 210 communicates with the collaboration service device 274 to monitor the status of the users in the requested directory listing and send messages to the client that include data describing the updated presence status of the users in the directory listing.

In one embodiment, the request for presence service described with reference to step 1002 includes a request for updates on the presence status of users until an event occurs that indicates that the CAS 210 should stop monitoring the presence status for these users. Examples of events that indicate the CAS 210 should stop monitoring the presence status for these users includes: (1) CAS 210 receives a message from the client cancelling the presence service; (2) the client logs out of CAS 210; and (3) the client is abandoned by CAS 210 due to inactivity. The CAS 210 monitors the presence status of one or more users (e.g., the presence status of a device associated with a user) and sends presence status update messages to the client responsive to a change in the presence status of one or more users. For example, and as a continuation of the example described above where presence status is provided with a directory listing, the user requests real-time updates on the presence status of the users included in the directory listing and updates on the presence status of the users included in the requested directory listing. The CAS 210 communicates with the collaboration service device 274 to monitor the status of the users in the requested directory listing and send messages to the client that update the presence status of the users in the directory listing. The client then generates and sends a message to the CAS 210 canceling the presence updates. The CAS 210 receives the message and ceases all presence monitoring and updates for the client.

In one embodiment, the client sends a single request message for a presence service to the CAS 210. The request message is a CAS message. The CAS message requests both the presence service and the directory listing in a single message. For example, the CAS message includes a request that the CAS 210 provide the client with the directory listing or a subset thereof with presence information for the entries in the directory listing. The server 330 receives the request, optionally translates the request and passes the request to the directory module 334. The directory module 334 receives the request from the server 330 and communicates with the presence module 350 and the collaboration services 274 to provide the requested service. The server 330 then sends a CAS message back to the client providing the requested directory listing and the requested presence information for the entries in the directory listing. In one embodiment, the single request described above also includes a request for updates about the presence information. In this embodiment, the directory module 334: (1) receives the request from the server 330; (2) performs the steps described above; and (3) communicates with the subscription module 324 to subscribe the client to updates about the presence information similar to the description in the two paragraphs immediately above this paragraph.

In one embodiment, the presence module 350 communicates with the collaboration services 274 and other CAS modules 324, 332, 334, 336, 338, 340 360 to provide a compound presence service to a client. The compound presence service provides presence information to a one or more clients who have one or more presence-enabled addresses. Such a client device can include, for example, an IP phone 228, an externally assigned cell phone (not pictured), an externally assigned smartphone (not pictured) or any similar device. These devices are referred to herein as "presence-enabled devices." The presence-enabled devices can include any device capable of communicating with the collaboration services 274 to provide a presence status. In one embodiment, the compound presence service provided by the presence module 350 provides one or more of the following: (1) information about a telephony presence (e.g., whether a user is using their phone and/or how the user is using their phone (such as IP phone 228), or a system that knows about other types of phones); (2) information about a instant messaging presence (i.e., information about a user's available for receiving instant messages); (3) information about a mobile phone presence (i.e., whether a user is using a mobile phone (not pictured), how a user is using a mobile phone and/or whether a person is available to make and/or receive a call on a mobile phone); (4) a rollup presence (i.e., a rollup presence is a single presence state that rolls up the presences of all endpoints into one value—this is explained in further detail below); and (5) any combination of the above described presence services (e.g., the presence module 350 retrieves a telephony presence and an instant messaging presence for client, or the presence module 350 retrieves all of the above described presence information for a client (referred to herein as a "everything presence request"). For example, a first client is a first PCM 202 operating on a first personal computer. Persons having ordinary skill in the art will recognize that other clients are possible. A second user is associated with an IP phone 228 and a second PCM 202. The first PCM 202 sends a CAS message to the CAS 210 including a compound presence request. A compound presence request is a presence request that includes a request for more than one type of presence service. In this example, the compound presence request includes a telephony address and an instant messaging address for the second IP phone 228 and the second PCM 202 (i.e., the first user is requesting presence information about the second user). The server 330 receives the compound presence request and relays the request to the presence module 350. The presence module 350 analyzes the compound presence request and identifies the telephony address and the instant messaging address. Since the compound presence request includes both a telephony address and an instant messaging address, the presence module 350 determines that the first PCM 202 is requesting presence service for both telephony and instant messaging about the second user (i.e., about the second IP phone 228 and the second PCM 202). The presence module 350 then communicates with the telephony module 332 and the collaboration services 274 to provide a telephony presence service to the first PCM 202 (e.g., information about whether the second user is on the phone or not) and an instant messaging service (similar to what is described below with reference to FIGS. 11A and 11B) about the second user. Instant messages and instant messaging services are described in greater detail with reference to FIGS. 11A and 11B below.

In another embodiment, the compound presence request identifies a user and requests both telephony and instant message presence information for the user without providing the separate addresses. In this embodiment, presence module 350 utilizes storage 239 to determine the telephony address and instant message address from the user identifier and proceeds to provide the presence information utilizing these addresses.

In one embodiment, the directory module 334 and/or the presence module 350 provide a client (or a user of the client) with directory and/or presence information for only those entries they are authorized to receive such information for. In one embodiment, a client (or a user of the client) is authorized to receive directory data for certain entries but not the corresponding presence data for those entities. In one embodiment, the directory module 334 returns directory entries for a larger number of authorized entries but the presence module 350 returns presence information for only the subset that the client is authorized to receive As stated above, in one embodiment the presence module 350 is adapted to provide a rollup presence service to a client. There are various different embodiments of a rollup presence, including, for example, (1) a most available rollup presence and (2) a semi-available rollup presence. A person having ordinary skill in the art will recognize that other types of rollup presences are possible.

A most available rollup presence service describes a second user as a being "available" (or any other similar characterization) if the user is available on at least one client. For example, a second user is associated with multiple addresses such as an extension number and an instant messaging address ("IM address"). The second user's status on their extension (which could, for example, be assigned to the IP phone 228) describes a telephony presence for the second user and the second user's IM status (e.g., on an instant messaging server (not pictured)) describes an IM presence for the second user. A first user accesses a client and requests a most available presence service for the second user. The presence module 350 receives the request and communicates with the telephony module 332 and the collaboration services 274 to determine the telephony presence and the IM presence for the second user. So long as the second user is "available" via ether telephony or IM, the presence module 350 sends a message to the first client indicating that the second user is "available." If the second user is not "available" via either telephony or IM, the presence module 350 sends a message to the first client indicating that the second user is "not available" (or any other similar characterization) or "offline." A person having ordinary skill in the art will recognize that there are other ways to implement a most available rollup presence.

A semi-available rollup presence service is similar to a most available rollup presence service. The difference here is that a semi-available rollup presence service describes a second user as a being "semi-available" (or any other similar characterization) if the user is not available on every client associated with that user. For example, a second user is associated with multiple clients with multiple addresses such as an extension number and an IM address. A first user accesses a client and requests a semi-available presence service for the second user. The presence module 350 receives the request and communicates with the telephony module 332 and the collaboration services 274 to determine the telephony presence and the IM presence for the second user. So long as the second user "available" at one but not all of the communication services (i.e., telephony and IM), the presence module 350 determines the second user to be "semi-available" and the presence module 350 sends a message to the first client indicating that the second user is "semi-available" (or any other similar characterization). If the second user is not "available" via either telephony or IM, the presence module 350 sends a message to the first client indicating that the second user is "not available" (or "offline"). A person having ordinary skill in the art will recognize that there are other ways to implement a semi-available rollup presence.

Figure 11A:
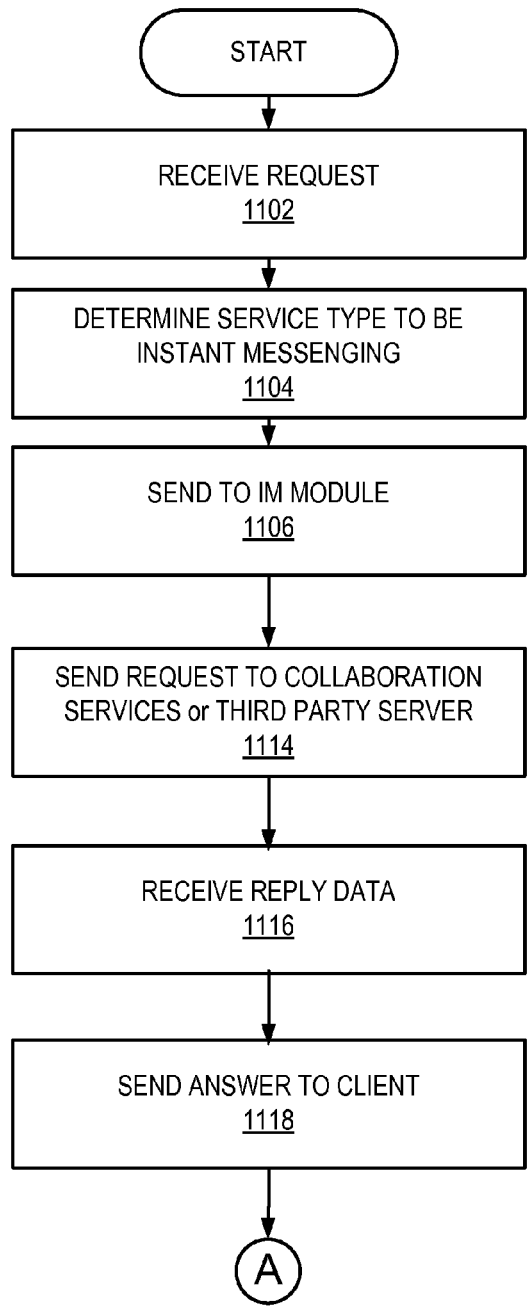
FIGS. 11A and 11B are a flowchart illustrating a method performed by the client application server to provide an instant messaging service according to one embodiment of the present invention.
Figure 11B:
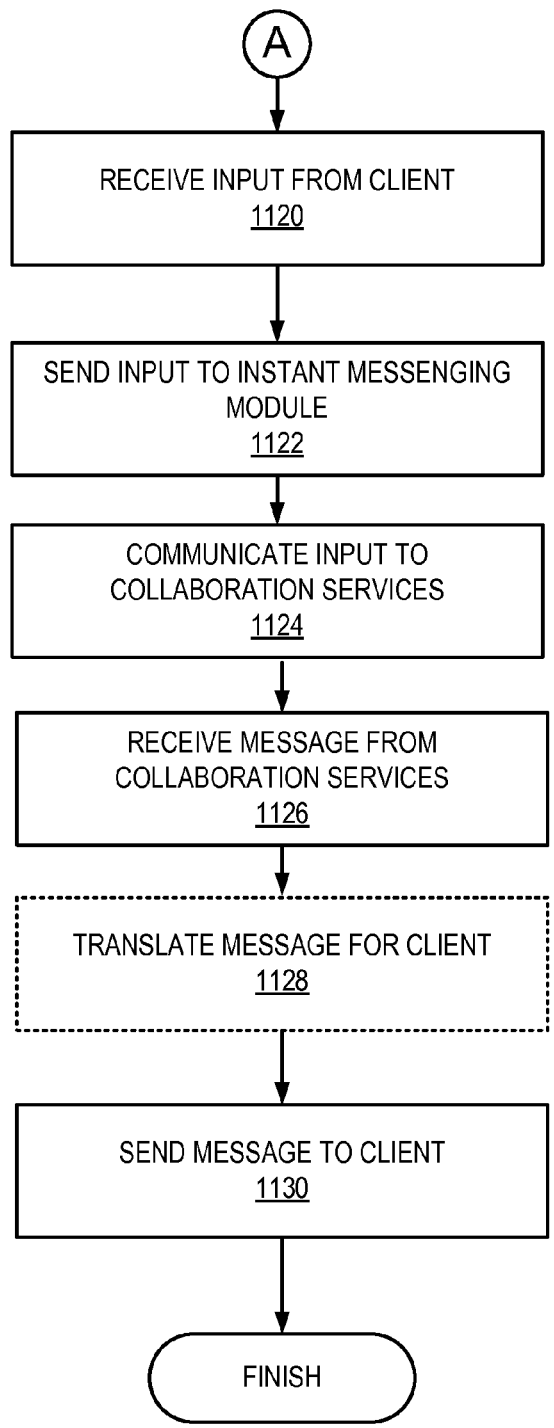

FIGS. 11A and 11B depict a method 1101 for providing an instant messaging service to a client according to one embodiment of the present invention. The client initiates a request for an instant messaging service. For example, the client is a web browser operated on a personal computer. A human user of the client provides inputs indicating that an instant messaging service is requested. For example, the user provides an input indicating that the user desires to start an instant messaging session. Starting the instant messaging session will result in the browser exposing a new graphic window in which the user writes text for instant messages. The web browser generates a CAS message requesting the instant messaging service. This message is referred to herein as the first IM request message. The server 330 receives 1102 the first IM request message. For example, the server 330 receives 1102 the CAS message generated by the web browser. The server 330 determines 1104 that the message is requesting an instant messaging service. The server 330 sends 1106 the first IM request message to the instant messaging module 360. The instant messaging module 360 generates 1114 a request for an instant messaging service for the client to the collaboration services device 274. The collaboration services device 274 receives the request and returns reply data to the instant messaging module 360. The reply data includes, for example, graphics data that causes a window to be exposed on a display associated with the client device which can be used by the client for instant messaging. The instant messaging module 360 receives 1116 the instant messaging data and sends it in a reply message to the server 330. The server 330 translates the reply message into a CAS message referred to herein as the first IM reply message. The server 330 sends 1118 the first IM reply message to the client. The first IM reply includes the instant messaging data.

With reference to FIG. 11B, the server 330 receives 1120 a message from the client including a response input from the client. This message is referred to herein as the IM response input message. For example, the web browser receives the first IM reply message and causes the new instant messaging window to be exposed using the graphics data included in the message. The user types an instant message and presses the "enter" key (or the "return" key). The web browser generates a CAS message that includes the instant message and sends the IM response input message to the server 330. The server 330 sends 1122 the IM response input message to the instant messaging module 360. The instant messaging module 360 sends the IM response input message to the collaboration services device 274. In one embodiment, instead of sending 1122 the input message to the instant messaging module 360, the server 330 sends the input message to the collaboration services device 274. The collaboration services device 274 receives and processes the input message. For example, the collaboration services device 274 communicates with a second web browser in use by a second user and relays an instant message to the second browser based on the IM response input message. The collaboration services device 274 receives a response from the second browser. For example, the response from the second browser is an instant message for the first user from the second user. This response is referred to herein as a "second IM response input message." The instant messaging module 360 receives the second IM response input message from the collaboration services device 274 and sends it to the server 330 in a message. The server 330 translates 1128 the message for the client. For example, the server 330 translates 1128 the message to be a CAS message that includes the data included in the second IM response input message. This message is referred to herein as the second IM reply message. Step 1128 is depicted in FIG. 11B with a dashed line since it is an optional step in method 1101. For example, in one embodiment the second IM response input message sent from the collaboration services device 274 to the CAS 210 is a CAS message that does not require translation by the server 330. The server 330 sends 1130 the second IM reply message to the first web browser.

Figure 12:
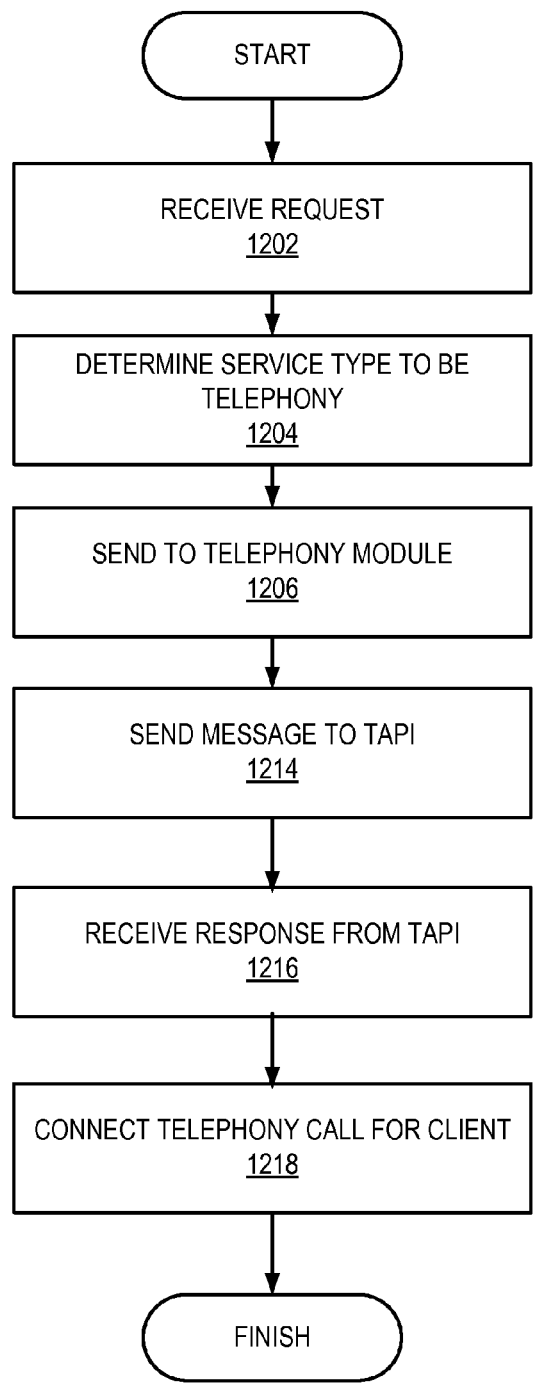
FIG. 12 is a flowchart illustrating a method performed by the client application server to provide telephony call service according to one embodiment of the present invention.

FIG. 12 depicts a method 1201 for providing a telephony service to a client according to one embodiment of the present invention. The client initiates a request for a telephony service. For example, the client is a web client 208 operating on a personal computer requesting a telephone call with another telephony device. The web client 208 generates a CAS message requesting the telephony service. This message is referred to herein as the telephony request message. The server 330 receives 1202 the telephony request message. For example, the server 330 receives 1202 the CAS message generated by the web client 208. The server 330 determines 1204 that the message is requesting a telephony service. The server 330 sends 1206 the telephony request message to the telephony module 332. The telephony module 332 sends 1214 a message to the TAPI 218 indicating the requesting telephony service. The TAPI 218 communicates with the TMS 222 to connect the call. The telephony module 332 receives a response from the TAPI 218. For example, the TAPI 218 signals the telephony module 332 to indicate that the call has been placed. The TAPI 218 communicates with the TMS 222 to connect 1218 the telephony call for the client.

Figure 13A:
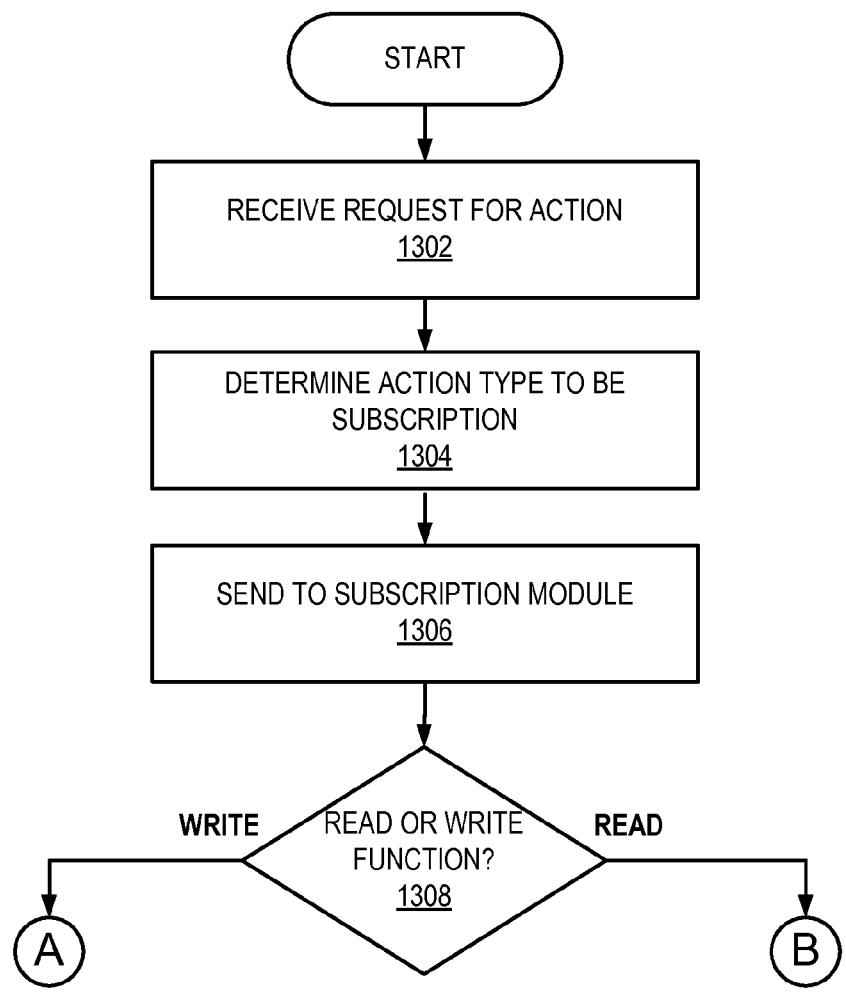
FIGS. 13A and 13B is a flowchart illustrating a method performed by the client application server to provide a subscription service according to one embodiment of the present invention.
Figure 13B:
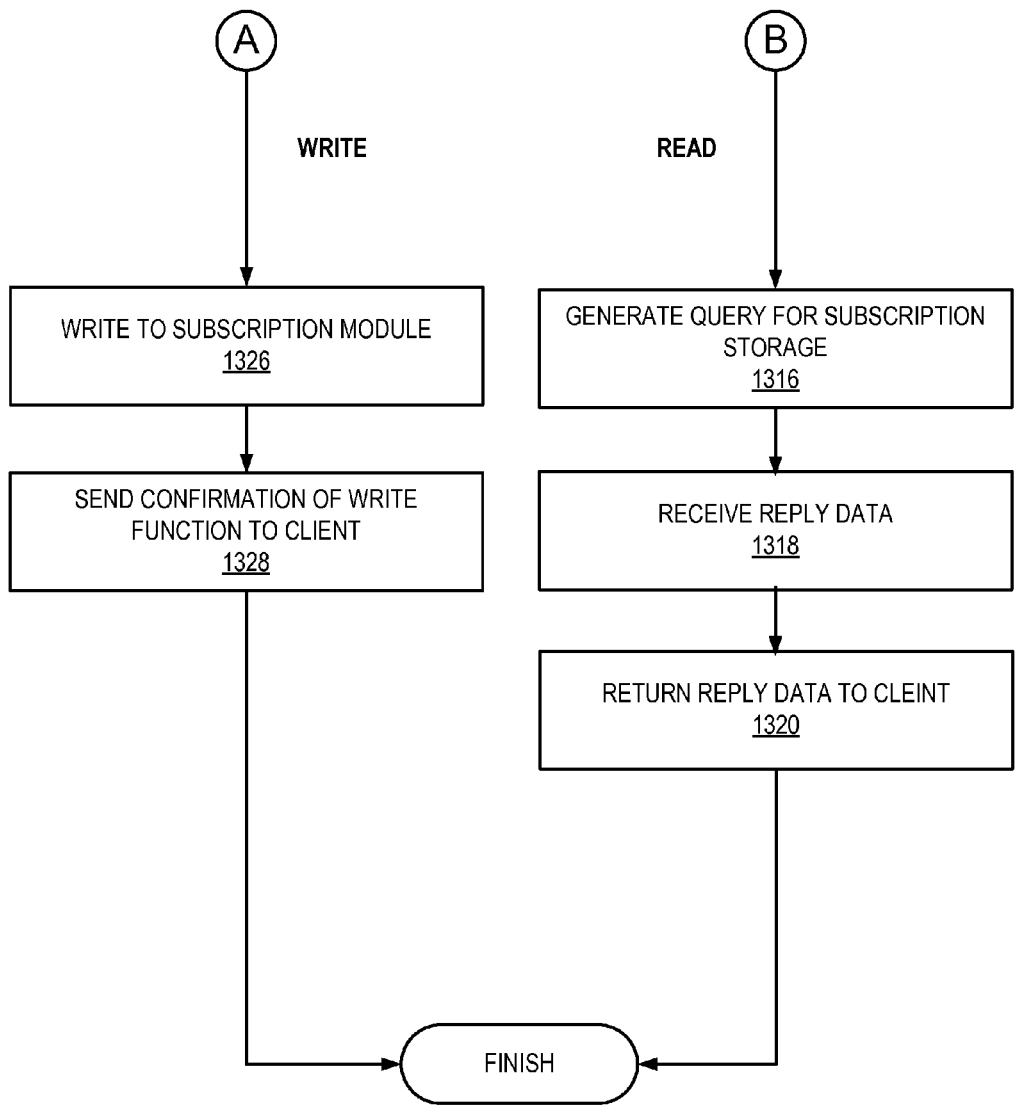

FIGS. 13A and 13B depict a method 1301 for providing a subscription service to a client according to one embodiment of the present invention. The client initiates a request for a subscription service similar to the presence description described above for FIG. 10. For example, the client is a web client 208 requesting to subscribe to receive a call change event. A call change event is a notification sent following the occurrence of a particular telephony event. Numerous examples of call change events are described throughout the priority application, including, for example, a notification sent to a client upon the occurrence of a call being picked up from an offering extension. Accordingly, in this example the web client 208 subscribes to receive a call change event when a call is picked up from an offering extension. The web client 208 generates a CAS message requesting the subscription service. This message is referred to herein as the first subscription request message. The server 330 receives 1302 the first subscription request message. For example, the server 330 receives 1302 the CAS message generated by the web client 208. The server 330 determines 1304 that the message is requesting a subscription service. The server 330 sends 1306 the message to the subscription module 324. In one embodiment, the subscription storage 472 includes a non-transitory memory (e.g., flash, a hard drive, a hard drive storing a database) that comprises the subscriptions for one or more clients. For example, the subscription storage 472 is a memory storing a data that comprises the subscriptions for one or more clients. The subscription module 324 determines whether the message is requesting a read function for the subscription storing (e.g., provide the user with a list of current subscriptions) or a write function for the subscription database (e.g., add or delete a subscription to the subscription database).

With reference to FIG. 13B, the "read" service continues at step 1316 where the subscription module 324 generates 1316 a query for the subscription database. For example, a query that retrieves a list of the subscriptions for a client device. The subscription module 324 receives 1318 reply data responsive to the query. The subscription module 324 sends the reply data to the server 330 and the server 330 generates a CAS message that includes the reply data. This message is referred to herein as a subscription reply message. The server 330 sends 1320 the subscription reply message to the client.

Still referring to FIG. 13B, the "write" service continues at step 1326 where the subscription module 324 writes new data to the subscription database. For example, the subscription module 324 writes a new subscription to the subscription database responsive to the request received from the client. The server 330 sends 1328 a message that includes confirmation of the write function to the client. This message is referred to herein as the second subscription reply message.

In one embodiment, the both read and write functions, the subscription database returns a summary subscription list. The summary subscription list describes all or a portion of the subscriptions for the client.

Figure 14:
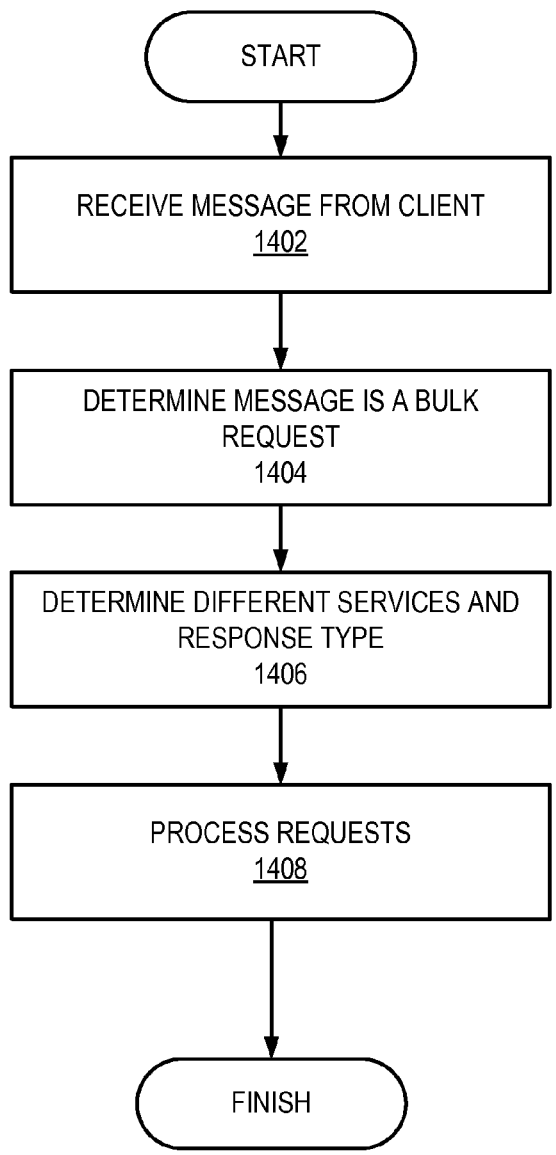
FIG. 14 is a flowchart illustrating a method performed by the client application server to process bulk commands according to one embodiment of the present invention.

FIG. 14 depicts a method 1401 for the CAS 210 to process bulk requests according to one embodiment of the present invention. Described at a high level, the CAS 210 receives a single request message 1402 from the client that includes any number of requests. For example, a single message from a client includes one hundred different requests. A request message from a client that includes multiple requests is referred to herein as a bulk request. The CAS 210 processes a bulk request in a number of ways. For example, the client can send an instruction to the CAS 210 telling the CAS 210 how to process bulk requests in general, or telling the CAS 210 how to process a particular request included in the bulk request. The client can specify that the CAS 210 process the bulk request in the following ways: (1) the CAS 210 sends multiple responses to the client responsive to two or more requests included in the bulk request, and the responses are sent at the same time (referred to herein as a "bulk response"); and/or (2) the CAS 210 sends responses to the client in series as requests are processed and these responses can be sent to the client individually and at different times depending on the times at which the CAS 210 processes the requests (referred to herein as "serial responses").

The CAS 210 receives 1402 a CAS message from the client. The CAS message is a bulk request. The bulk request includes multiple requests and specifies how to process replies to the requests. The CAS 210 determines 1404 that the CAS message includes multiple requests and is therefore a bulk request. The CAS 210 determines 1406 the different types of services requested by each different request. The CAS 210 determines 1406 how the client wants the replies to be delivered, e.g., (1) bulk responses, (2) serial responses or (3) a mixture of bulk responses and serial responses. The CAS 210 processes 1408 the different requests as specified above for FIGS. 5A-13B and sends the responses to the client as determined in step 1406. The priority application includes additional description relevant to step 1408.

Figure 15:
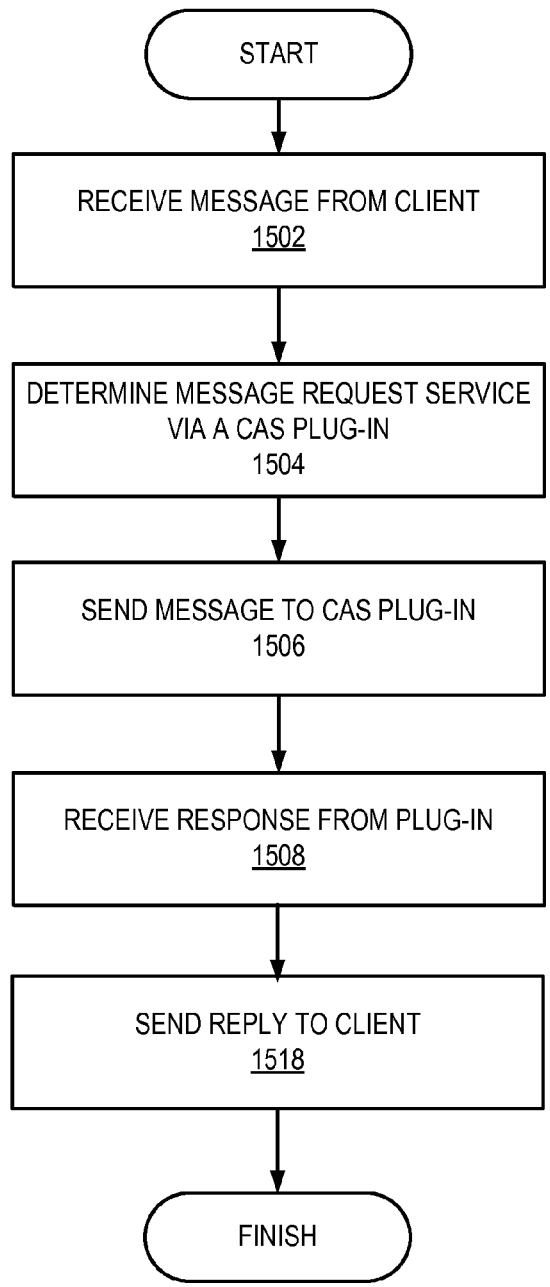
FIG. 15 is a flowchart illustrating a method performed by the client application server to provide a plug-in service according to one embodiment of the present invention.

FIG. 15 depicts a method 1501 for providing a service and/or event to a client using a CAS plug-in 255 according to one embodiment of the present invention. The client initiates a request for a plug-in service and/or plug-in event. For example, the client is a web client 208 operating on a personal computer requesting a call handling mode status of a client device using the CAS plug-in 255. The web client 208 generates a CAS message requesting the plug-in service. This message is referred to herein as the plug-in request message. The server 330 receives 1502 the plug-in request message. For example, the server 330 receives 1502 the CAS message generated by the web client 208. The server 330 determines 1504 that the message is requesting a plug-in service. The server 330 sends 1506 the plug-in request message to the CAS plug-in 255. The server 330 receives 1508 a response from the CAS plug-in 255 including the requested call handling data. The server 330 sends 1518 a reply message to the client including the requested call handling data. Registration of the CAS plug-in 255 is described in the priority application.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for unified communication, the method comprising:
receiving, from a client, a Client Application Server (CAS) message encoded in a CAS format having a standardized header and including a request for a unified communication service, the request including a request for a subscription service, wherein the standardized header is one of a plurality of predetermined headers used by a plurality of client types, the subscription service registering the client to receive notifications for changes to a service provided by the unified communication service;
subscribing the client to the subscription service;
sending the request to the service provider;
determining a service type for the request based on information in the CAS message;
configuring one or more permissions based on the request to: (1) determine one or more features of the service type to be provided to the client and (2) prevent the client from offering a user an option that exceeds the scope of features of the service type based on the one or more permissions;
determining that the CAS communicates asynchronously with a service provider via an intermediary;
notifying the client of an asynchronous communication status between the CAS and the service provider; and
sending a reply message in response to the request for the unified communication service to the client, the reply message including data comprising notifications in changes in services provided by the CAS in accordance with the subscription service and permission data describing the one or more permissions.

2. The method of claim 1, wherein sending the request to the service provider is based on the determined service type of the request.

3. The method of claim 1, wherein the CAS message is encoded in one of JavaScript Objection Notation ("JSON") and Extensible Markup Language ("XML").

4. The method of claim 1, wherein the service type is one or more of: a telephony service; a directory service; a configuration service; a voicemail service; a call history service; a presence service; an instant messenger service; and a plug-in service.

5. The method of claim 1, wherein the service type is a plug-in service that is provided by a CAS plug-in.

6. The method of claim 1, wherein the permission data specifies what actions the client can take with the unified communication service.

7. The method of claim 1, wherein the request is a bulk request comprising two or more requests.

8. The method of claim 7 further comprising:
determining different services and response types for the requests in the bulk request; and
processing the requests.

9. A computer program product comprising a non-transitory computer readable medium storing a computer readable program, wherein the computer readable program when executed on a computer causes the computer to perform steps comprising:
receiving, from a client, a Client Application Server (CAS) message encoded in a CAS format having a standardized header and including a request for a unified communication service, the request including a request for a subscription service, wherein the standardized header is one of a plurality of predetermined headers used by a plurality of client types, the subscription service registering the client to receive notifications for changes to a service provided by the unified communication service;
subscribing the client to the subscription service;
sending the request to the service provider;
determining a service type for the request based on information in the CAS message;
configuring one or more permissions based on the request to: (1) determine one or more features of the service type to be provided to the client and (2) prevent the client from offering a user an option that exceeds the scope of features of the service type based on the one or more permissions;
determining that the CAS communicates asynchronously with a service provider via an intermediary;
notifying the client of an asynchronous communication status between the CAS and the service provider; and
sending a reply message in response to the request for the unified communication service to the client, the reply message including data comprising notifications in changes in services provided in accordance with the subscription service and permission data describing the one or more permissions.

10. The computer program product of claim 9, wherein the executed computer readable program causes the computer to perform further steps comprising sending the request to a service provider.

11. The computer program product of claim 10, wherein sending the request to the service provider is based on the determined service type of the request.

12. The computer program product of claim 9, wherein the CAS message is encoded in one of JavaScript Objection Notation ("JSON") and Extensible Markup Language ("XML").

13. The computer program product of claim 9, wherein the service type is one or more of: a telephony service; a directory service; a configuration service; a voicemail service; a call history service; a presence service; an instant messenger service; and a plug-in service.

14. The computer program product of claim 9, wherein the service type is a plug-in service that is provided by a CAS plug-in.

15. The computer program product of claim 9, wherein the reply message includes data describing a change related to the subscription service.

16. The computer program product of claim 9, wherein the permission data specifies what actions the client can take with the unified communication service.

17. The computer program product of claim 9, wherein the request is a bulk request comprising two or more requests.

18. The computer program product of claim 17, wherein the executed computer readable program causes the computer to perform further steps comprising:
determining different services and response types for the requests in the bulk request; and
processing the requests.

19. A system for unified communication, the system comprising:
a client; and
a Client Application Server (CAS), including a memory and a computer processor, communicatively coupled to the client and comprising a server communicatively coupled to a number of service providers and a CAS application, the CAS configured to receive from the client a CAS message encoded in a CAS format having a standardized header and including a request for a unified communication service, the request including a request for a subscription service, wherein the standardized header is one of a plurality of predetermined headers used by a plurality of client types, the subscription service registering the client to receive notifications for changes to a service provided by the unified communication service, the CAS configured to:

send the request to the service provider;

determine a service type for the request based on information in the CAS message;

configure one or more permissions based on the request to: (1) determine one or more features of the service type to be provided to the client and (2) prevent the client from offering a user an option that exceeds the scope of features of the service type based on the one or more permissions;

determine that the CAS communicates asynchronously with a service provider via an intermediary;

notify the client of an asynchronous communication status between the CAS and the service provider; and send a reply message to the client in response to the request for the unified communication service, the reply message including data comprising notifications in changes in services provided by the CAS in accordance with the subscription service and permission data describing the one or more permissions.

20. The system of claim 19, wherein the server receives the CAS message and sends the CAS message to one of the number of service providers.

21. The system of claim 20, wherein the server communicates with the CAS application to determine a service type of the request, and wherein the server sends the CAS message to the one service provider based on the determined service type.

22. The system of claim 19, wherein the CAS message is encoded in one of JavaScript Objection Notation ("JSON") and Extensible Markup Language ("XML").

23. The system of claim 19, wherein the service type is one or more of: a telephony service; a directory service; a configuration service; a voicemail service; a call history service; a presence service; an instant messenger service; and a plug-in service.

24. The system of claim 19, wherein the CAS further comprises a CAS plug-in communicatively coupled to the server, and wherein the service type is a plug-in service that is provided by the CAS plug-in.

25. The system of claim 19, wherein the Client Application Server includes a thread pool including a plurality of threads, wherein a thread in the thread pool is not assigned to a particular client and may handle a request from any client, the thread chosen to process the request from the client.

26. The system of claim 19, wherein the permission data specifies what actions the client can take with the unified communication service.

27. The system of claim 19, wherein the request is a bulk request comprising two or more requests.

28. The system of claim 27, wherein the server communicates with the CAS application to determine different services and response types for the requests in the bulk request and processes the requests.

* * * * *